US012361673B2

(12) United States Patent
Peng et al.

(10) Patent No.: US 12,361,673 B2
(45) Date of Patent: Jul. 15, 2025

(54) ANTI-SPOOFING IN CAMERA-AIDED LOCATION AND PERCEPTION

(71) Applicant: QUALCOMM Incorporated, San Diego, CA (US)

(72) Inventors: Yuxiang Peng, Sunnyvale, CA (US); Gengsheng Zhang, Cupertino, CA (US); Ning Luo, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 18/168,977

(22) Filed: Feb. 14, 2023

(65) Prior Publication Data

US 2024/0273859 A1  Aug. 15, 2024

(51) Int. Cl.
| | |
|---|---|
| *G06T 7/00* | (2017.01) |
| *G06T 7/20* | (2017.01) |
| *G06T 7/571* | (2017.01) |
| *G06T 7/73* | (2017.01) |
| *G06V 10/40* | (2022.01) |

(Continued)

(52) U.S. Cl.
CPC ......... *G06V 10/751* (2022.01); *G06T 7/0002* (2013.01); *G06T 7/20* (2013.01); *G06T 7/571* (2017.01); *G06T 7/74* (2017.01); *G06V 10/40* (2022.01); *G06V 20/56* (2022.01); *H04N 23/67* (2023.01); *H04W 12/104* (2021.01); *H04W 12/122* (2021.01); *G06T 2207/10148* (2013.01); *G06T 2207/30244* (2013.01); *G06T 2207/30252* (2013.01)

(58) Field of Classification Search
CPC ...... G06V 10/751; G06V 10/40; G06V 20/56; G06T 7/74; G06T 7/571; G06T 7/0002; G06T 7/20; G06T 2207/10148; G06T 2207/30244; G06T 2207/30252; H04W 12/122; H04W 12/104; H04N 23/67
See application file for complete search history.

(56) References Cited

U.S. PATENT DOCUMENTS

2019/0243002 A1* 8/2019 Song ................. G01S 19/20
2020/0033880 A1* 1/2020 Kehl ................. G06N 3/006
(Continued)

OTHER PUBLICATIONS

International Search Report and Written Opinion—PCT/US2024/011300—ISA/EPO—Jul. 12, 2024.
(Continued)

*Primary Examiner* — Zhihan Zhou
(74) *Attorney, Agent, or Firm* — Procopio, Cory, Hargreaves & Savitch LLP/Qualcomm

(57) ABSTRACT

Aspects presented herein may enable a UE to identify whether images captured by the camera(s) of the UE are spoofed (e.g., are real images or false/manipulated/virtual images, etc.). In one aspect, a UE obtains a set of images associated with a vision-aided positioning session, where the set of images is captured using at least one first camera. The UE detects that at least one spoofing feature is present in the set of images during the vision-aided positioning session. The UE stores or outputs an indication of the at least one spoofing feature based on the at least one spoofing feature being present in the set of images. The UE performs the camera-aided positioning session based on at least one non-spoofing feature, where the at least one non-spoofing feature is different from the at least one spoofing feature.

26 Claims, 13 Drawing Sheets

(51) Int. Cl.
    *G06V 10/75*     (2022.01)
    *G06V 20/56*     (2022.01)
    *H04N 23/67*     (2023.01)
    *H04W 12/104*     (2021.01)
    *H04W 12/122*     (2021.01)

(56) References Cited

U.S. PATENT DOCUMENTS

| | | | |
|---|---|---|---|
| 2020/0094847 A1* | 3/2020 | Goldman | G01S 17/10 |
| 2020/0380279 A1* | 12/2020 | Yang | G06V 40/161 |
| 2021/0009080 A1* | 1/2021 | Hu | G06V 10/454 |
| 2021/0397863 A1* | 12/2021 | Kose Cihangir | G06V 40/171 |
| 2022/0292785 A1* | 9/2022 | Jayaram | G06F 3/012 |
| 2024/0046708 A1* | 2/2024 | Refat | G06V 40/171 |

OTHER PUBLICATIONS

Partial International Search Report—PCT/US2024/011300—ISA/EPO—May 21, 2024.

* cited by examiner

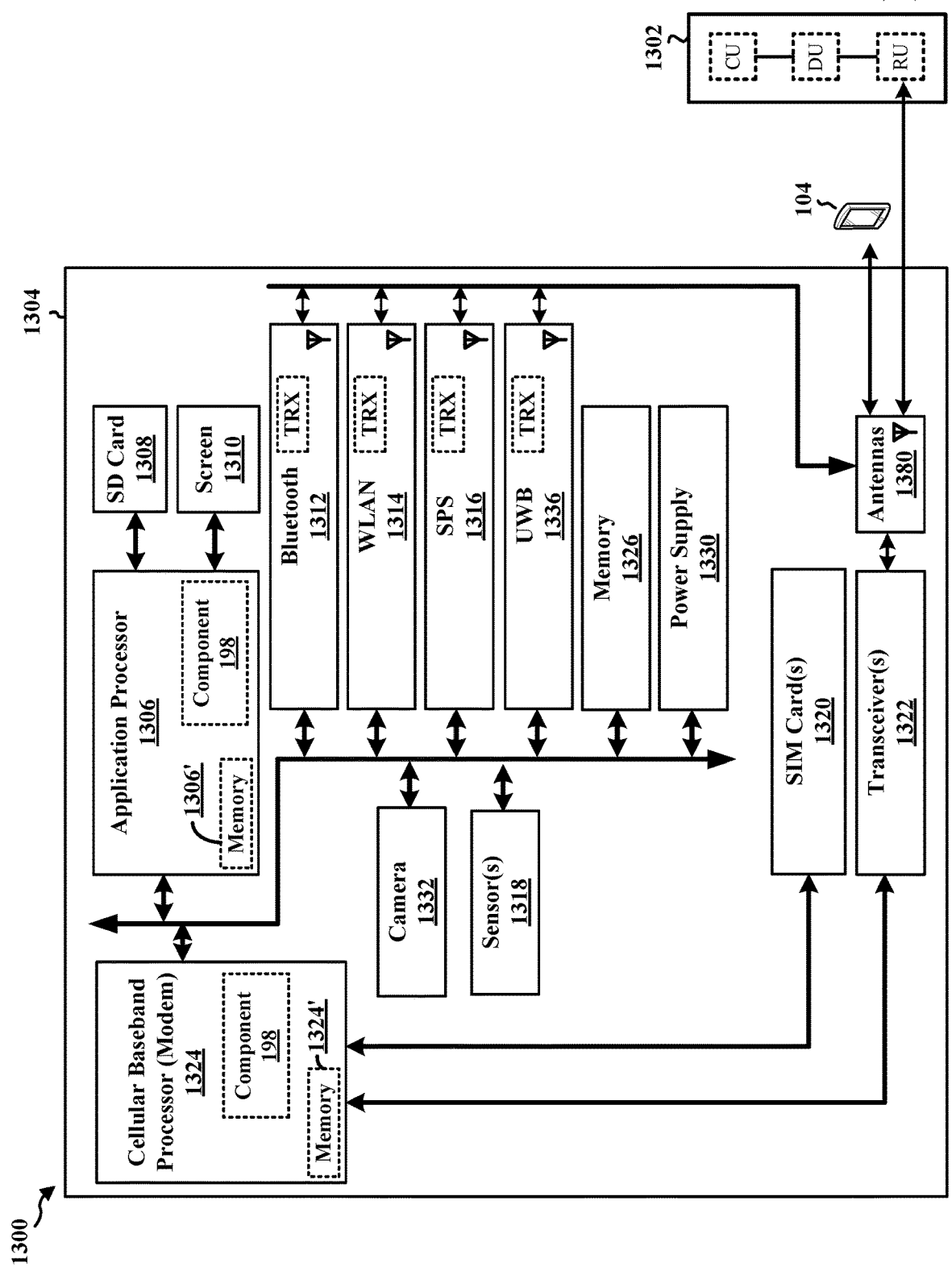

ANTI-SPOOFING IN CAMERA-AIDED LOCATION AND PERCEPTION

TECHNICAL FIELD

The present disclosure relates generally to communication systems, and more particularly, to a wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus obtains a set of images associated with a vision-aided positioning session, where the set of images is captured using at least one first camera. The apparatus detects that at least one spoofing feature is present in the set of images during the vision-aided positioning session. The apparatus stores or outputs an indication of the at least one spoofing feature based on the at least one spoofing feature being present in the set of images.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 13 is a diagram illustrating an example of a hardware implementation for an example apparatus and/or network entity.

DETAILED DESCRIPTION

Figure 1:
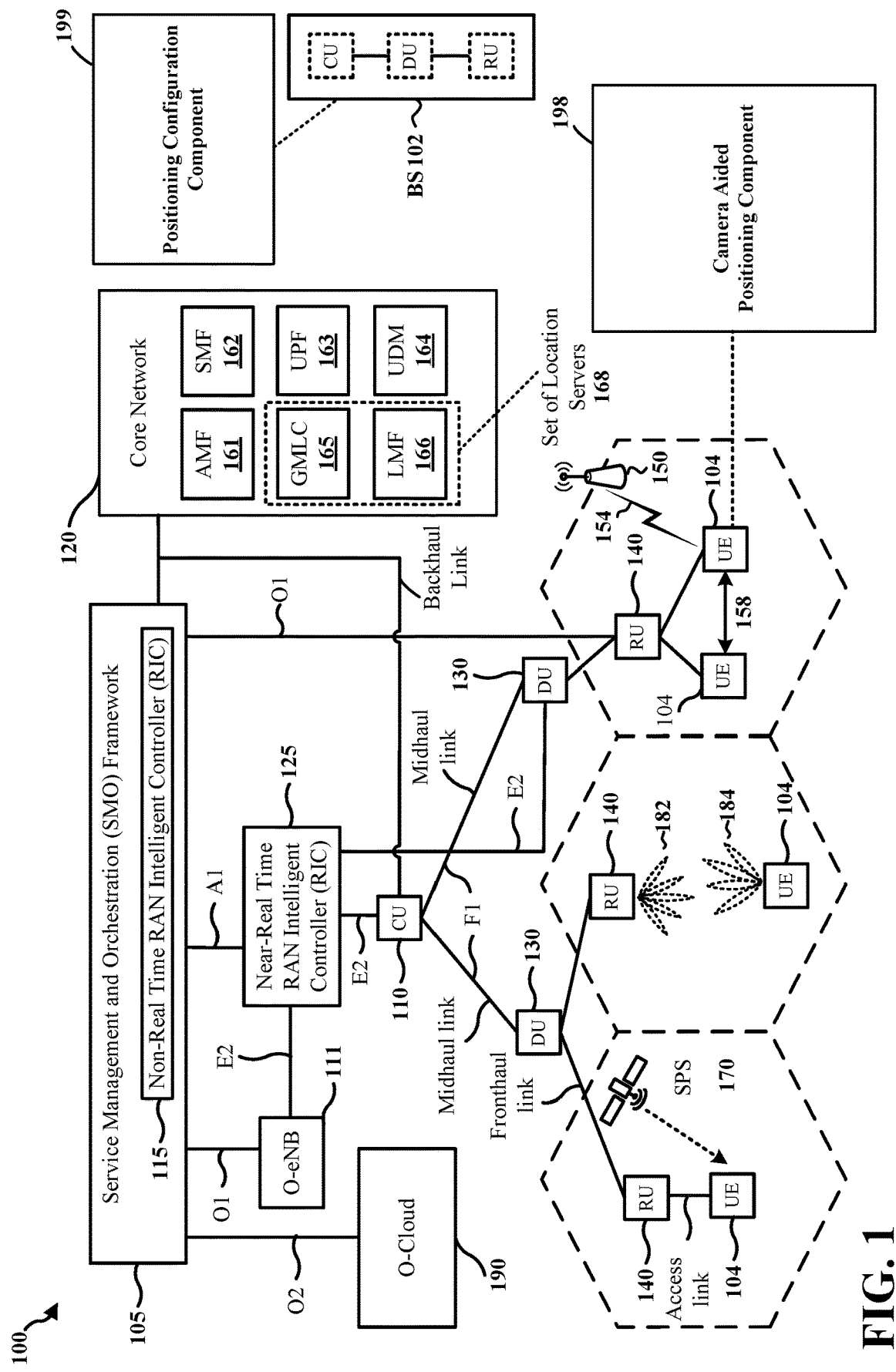
FIG. 1 is a diagram illustrating an example of a wireless communications system and an access network.

Aspects presented herein provide various anti-spoofing mechanisms/solutions that may improve the safety and reliability for camera-based positioning and/or camera-aided positioning. Aspects presented herein may enable a UE to identify whether images captured by the camera(s) of the UE are spoofed (e.g., are real images or false/manipulated/virtual images, etc.). In one aspect of the present disclosure, a UE may verify whether images captured by its camera are spoofed based on comparing the captured images with a map (e.g., a high-definition (HD) map). If the captured images have components different from the map, then the captured image may be spoofed. In another aspect of the present disclosure, a UE may verify whether images captured by its camera are spoofed based on changing the sampling rate of the camera, and the UE may determine that the captured images are spoofed if the captured images show certain patterns or observations (e.g., blank gaps) that may occur when the camera is operating at a higher sampling rate faster than the display rate of a video. In another aspect of the present disclosure, a UE may verify whether images captured by its camera are spoofed by crosschecking the captured images with images captured by other camera(s), and/or by changing the focal length of its camera. In another aspect of the present disclosure, a UE may verify whether images captured by its camera are spoofed based on performing geometry check for one or more objects in the captured images using additional sensor(s). If the UE determines that its captured images are spoofed, the UE may perform camera-based positioning and/or camera-aided positioning without the spoofed images/features. However, if the images are not spoofed, then the UE may continue to perform the camera-based positioning and/or the camera-aided positioning using its camera(s).

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit wireless signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a camera aided positioning component 198 that may be configured to obtain a set of images associated with a vision-aided positioning session, where the set of images is captured using at least one first camera; detect that at least one spoofing feature is present in the set of images during the vision-aided positioning session; and store or output an indication of the at least one spoofing feature based on the at least one spoofing feature being present in the set of images. In certain aspects, the base station 102 may have a positioning configuration component 199 that may be configured to configure camera aided/camera-based positioning parameters for a UE.

Figure 2:
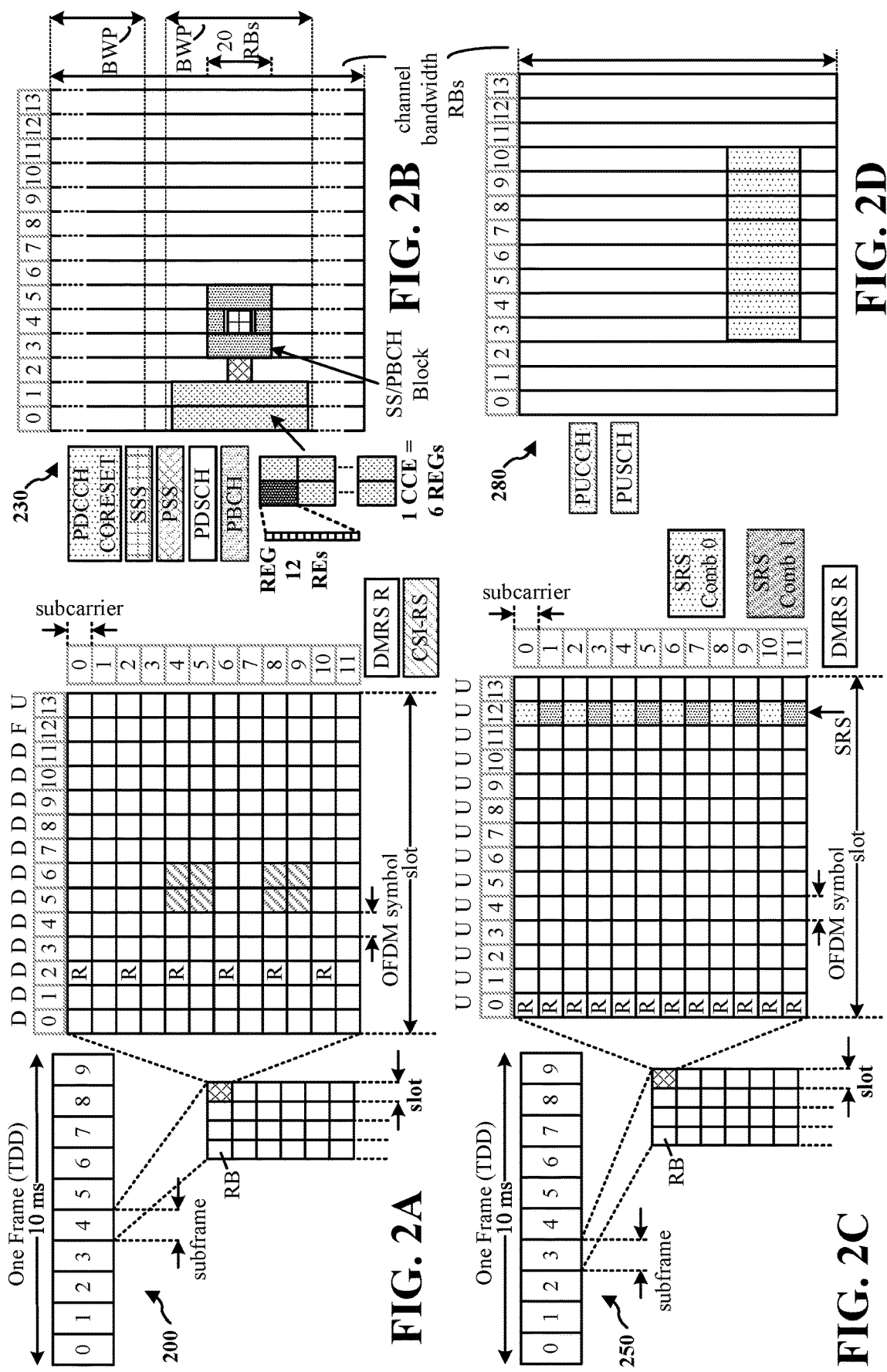
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu 0$ to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
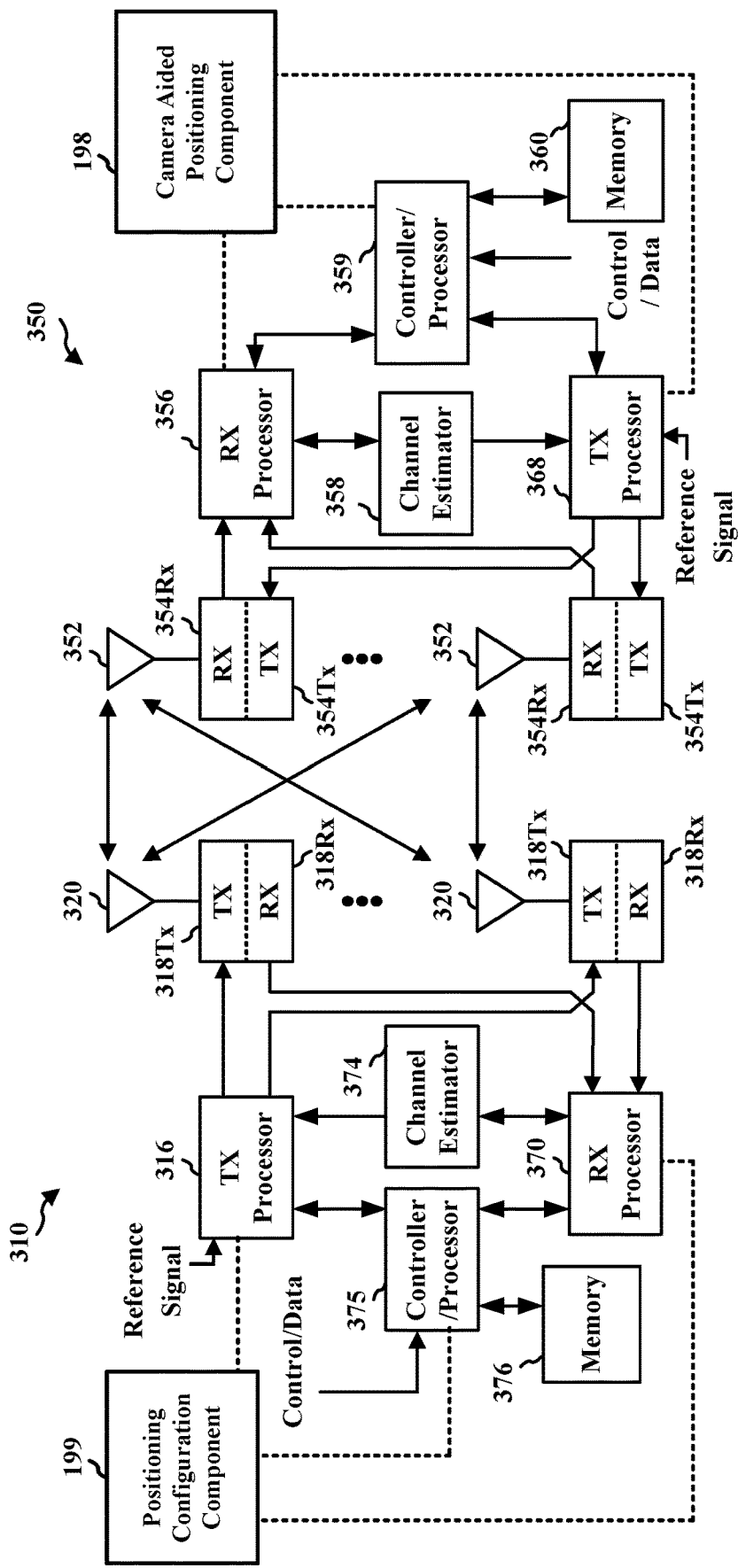
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency-domain, and then combined together using an Inverse Fast Fourier Transform (IFFT) to produce a physical channel carrying a time-domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency-domain using a Fast Fourier Transform (FFT). The frequency-domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the camera aided positioning component 198 of FIG. 1.

At least one of the TX processor 316, the RX processor 370, and the controller/processor 375 may be configured to perform aspects in connection with the positioning configuration component 199 of FIG. 1.

Figure 4:
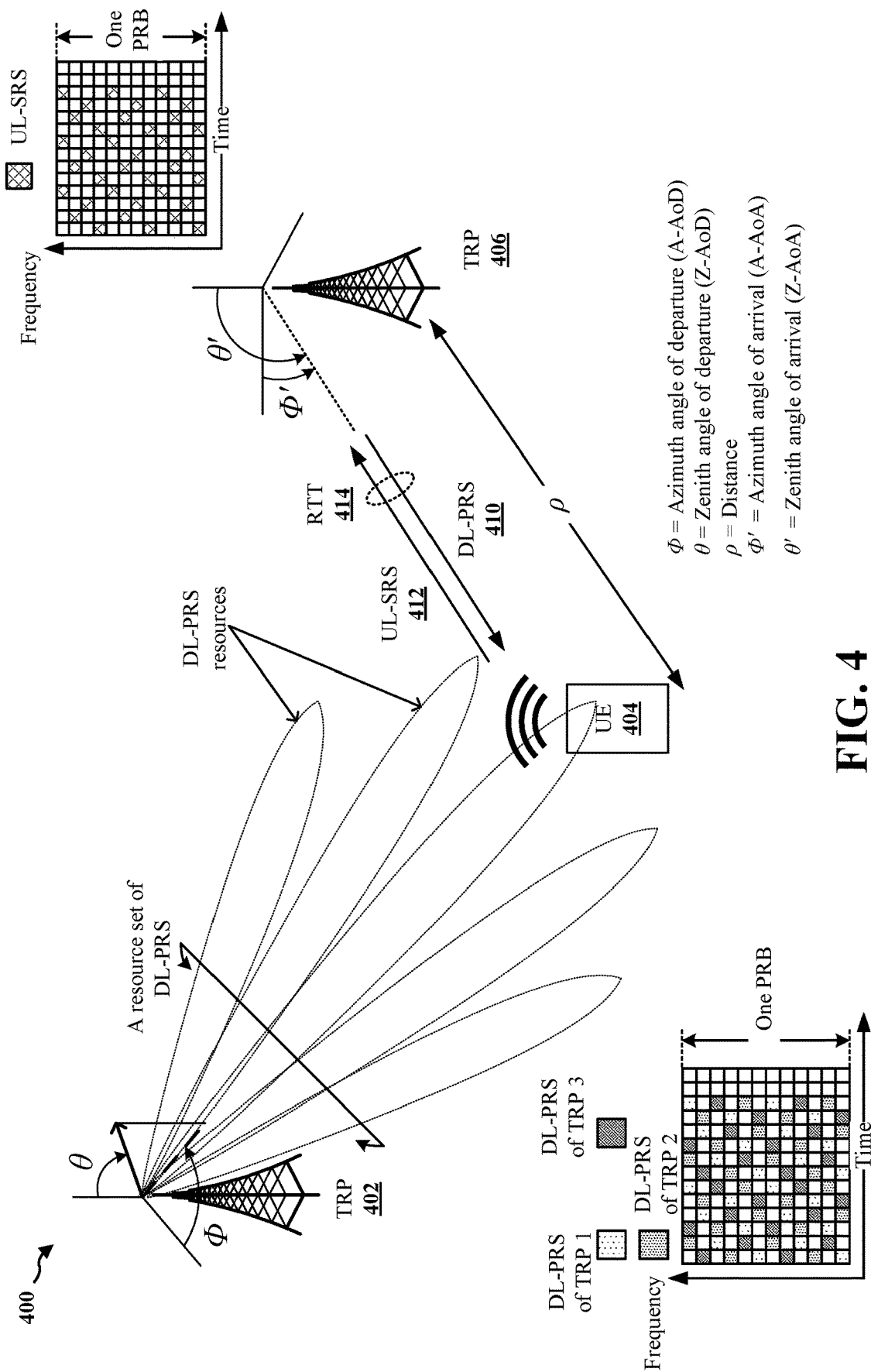
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX} - T_{PRS\_TX}\| - \|T_{SRS\_TX} - T_{PRS\_RX}\|$. Accordingly, multi-RTT positioning may make use of the UE Rx-Tx time difference measurements (i.e., $|T_{SRS\_TX} - T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

In addition to network-based UE positioning technologies, a wireless device (e.g., a base station/TRP, a UE, etc.) may also be configured to include radar capabilities, which may be referred to as "radio frequency (RF) sensing," "cellular-based RF sensing," and/or simply "sensing." For example, a wireless device may transmit radar reference signals (RRSs) and measure the RRSs reflected from one or more objects. Based at least in part on the measurement, the wireless device may determine or estimate a distance between the wireless device and the one or more objects. In another example, a first wireless device may also receive RRSs transmitted from one or more wireless devices, where the first wireless device may determine or estimate a distance between the first wireless device and one or more wireless devices based at least in part on the received RRS. As such, in some examples, RF sensing techniques may be used for UE positioning and/or for assisting UE positioning. For purposes of the present disclosure, a device that is capable of performing RF sensing (e.g., transmitting and/or receiving RRS for detecting an object) may be referred to as an "RF sensing node." For example, an RF sensing node may be a UE, a base station, a TRP, a device capable of transmitting RRS, and/or a device configured to perform radar functions, etc.

In addition to Global Navigation Satellite Systems (GNSS)-based positioning and network-based positioning, various camera-based positioning has also been developed to provide alternative/additional positioning mechanisms/modes. Camera-based positioning, which may also be referred to as "camera-based visual positioning," "visual positioning" and/or "vision-based positioning," is a positioning mechanism/mode that uses images captured by at least one camera to determine the location of a target (e.g., a UE or a transportation that is equipped with the at least one camera, an object that is in view of the at least one camera, etc.). For example, images captured by the dashboard camera (dash cam) of a vehicle may be used for calculating the three-dimensional (3D) position and/or 3D orientation of the vehicle while the vehicle is moving. In some implementations, camera-based positioning may provide centimeter-level and 6-degrees-of-freedom (6D) positioning. 6D is a representation of how an object moves through 3D space by either translating linearly or rotating axially (e.g., 3D position+3D attitude). For example, a single-degree-of-freedom on an object may be controlled by the up/down, forward/back, left/right, pitch, roll, or yaw. Camera-based positioning has great potential for various applications, especially in satellite-signal-degenerated environments.

In some scenarios, images captured by a camera may also be used for improving the accuracy/reliability of other positioning mechanisms/modes (e.g., the GNSS-based positioning, the network-based positioning, etc.), which may be referred to as "vision-aided positioning," "camera-aided positioning," "camera-aided location," and/or "camera-aided perception," etc. For example, while GNSS and/or inertial measurement unit (IMU) may provide good positioning/localization performance, when GNSS measurement outage occurs, the overall positioning performance might degrade due to IU bias drifting. Thus, images captured by the camera may provide valuable information to reduce errors. For purposes of the present disclosure, a positioning session (e.g., a period of time in which one or more entities are configured to determine the position of a UE) that is associated with camera-based positioning or camera-aided positioning may be referred to as a camera-based positioning session or a camera-aided positioning session. In some examples, the camera-based positioning and/or the camera-aided positioning may be associated with an absolute position of the UE, a relative position of the UE, an orientation of the UE, or a combination thereof.

Figure 5:
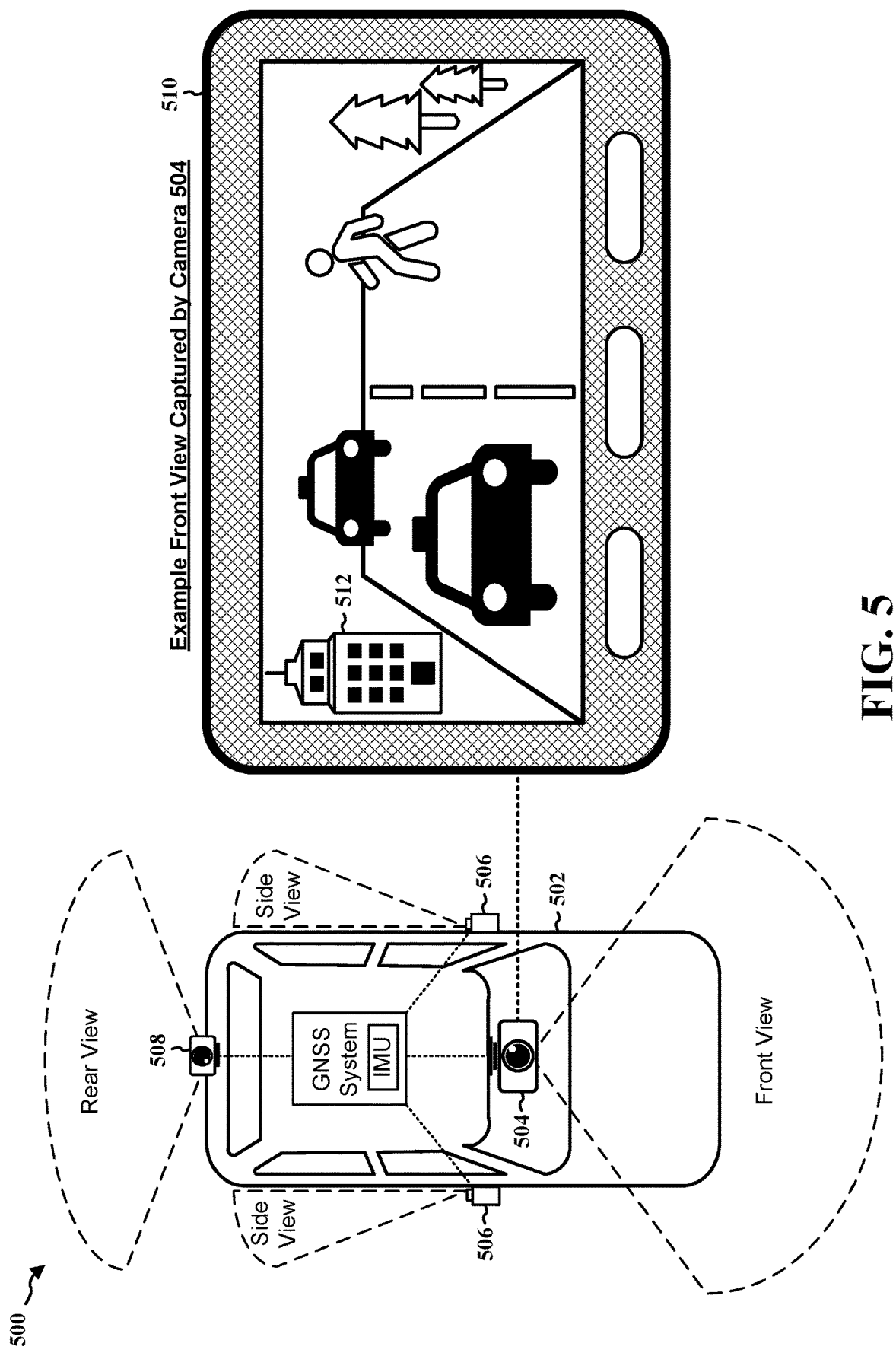
FIG. 5 is a diagram illustrating an example of camera-aided positioning in accordance with various aspects of the present disclosure.

FIG. 5 is a diagram 500 illustrating an example of camera-aided positioning in accordance with various aspects of the present disclosure. A vehicle 502 may be equipped with a GNSS system and a set of cameras, which may include a front camera 504 (for capturing the front view of the vehicle 502), side cameras 506 (for capturing the side views of the vehicle 502), and/or a rear camera 508 (for capturing the front view of the vehicle 502), etc. In some examples, the GNSS system may further include or be associated with at least one IMU (e.g., a GNSS+IMU system).

The GNSS system may estimate the location of the vehicle 502 based on receiving GNSS signals transmitted from multiple satellites (e.g., based on performing GNSS-based positioning). However, when the GNSS signals are not available or weak, such as when the vehicle 502 is in an urban area or in a tunnel, the estimated location of the vehicle 502 may become inaccurate. Thus, in some implementations, the set of cameras on the vehicle 502 may be used for assisting the positioning, such as for verifying whether the location estimated by the GNSS system based on the GNSS signals is accurate. For example, as shown at 510, images captured by the front camera 504 of the vehicle 502 may include/identify a specific building 512 (which may also be referred to as a feature) that is with a known location, and the vehicle 502 (or the GNSS system or a positioning engine associated with the vehicle 502) may determine/verify whether the location (e.g., the longitude and latitude coordinates) estimated by the GNSS system is in proximity to the known location of this specific building 512. Thus, with the assistance of the camera(s), the accuracy and reliability of the GNSS-based positioning may be further improved. For purposes of the present disclosure, a GNSS system that is associated with a camera (e.g., capable of performing camera-aided/based positioning) may be referred to as a "GNSS+camera system," or a "GNSS+ IMU+camera system" if the GNSS system is also associated with/includes at least one IMU).

While FIG. 5 uses the vehicle 502 as an example, it is merely for illustration purposes. Aspects presented herein may also apply to other types of transportations (e.g., motorcycles, bicycles, buses, trains, etc.), devices (e.g., UEs on pedestrians), and/or positioning mechanisms/modes (e.g., network-based positioning described in connection with FIG. 4). In addition, for purposes of the present disclosure, a positioning mechanism/mode (e.g., GNSS-based positioning, network-based positioning, etc.) that uses at least one sensor (e.g., an IMU, a camera) to assist the positioning may be referred to as a sensor fusion positioning.

While camera-based/camera-aided positioning (which may also be referred to as computer vision and/or feature-based positioning in some examples) may use static features (e.g., the specific building 512) to provide useful measurements to aid 6D camera pose estimation. Cameras may be affected by (susceptible to) environmental lighting conditions, image noise, and/or availability of features, etc. For example, a GNSS/IMU positioning engine may be benefitted from visual information provided by a camera when environmental conditions are favorable for the camera. However, when the visual feature quality provided by the camera is low or the information provided by the camera is misleading, the overall positioning performance may be degraded. In addition, while more and more sensor fusion positioning technologies are involved with cameras or vision-aiding, the lack of integrity protection for cameras or images captured by cameras may have constrained their utilization in applications where safety is important (i.e., safety-critical applications).

Image spoofing (or simply spoofing), which may also be referred to as a spoof/spoofing attack or a spoof/spoofing feature, is a form of cyberattack in which a malicious/ unauthorized device/person is providing falsified or fabricated videos/images to another device, usually to hamper another device or to achieve illegal purposes. For example, a spoofing attack/feature may include an attempt by an impostor to be successfully identified by a recognition system as someone else, such as by using a falsified photo or video to supersede the original owner's identity. Anti-spoofing (or anti-image spoofing) may refer to a set of countermeasures designed to mitigate or prevent the spoofing attacks. A non-spoofing image/video or feature may refer to an image/video or feature that is authentic and does not include falsified or fabricated videos/images. There are multiple and different types of image spoofing and anti-spoofing associated with camera-aided positioning, which may be categorized into "unintentional spoofing" and "intentional spoofing."

Figure 6:
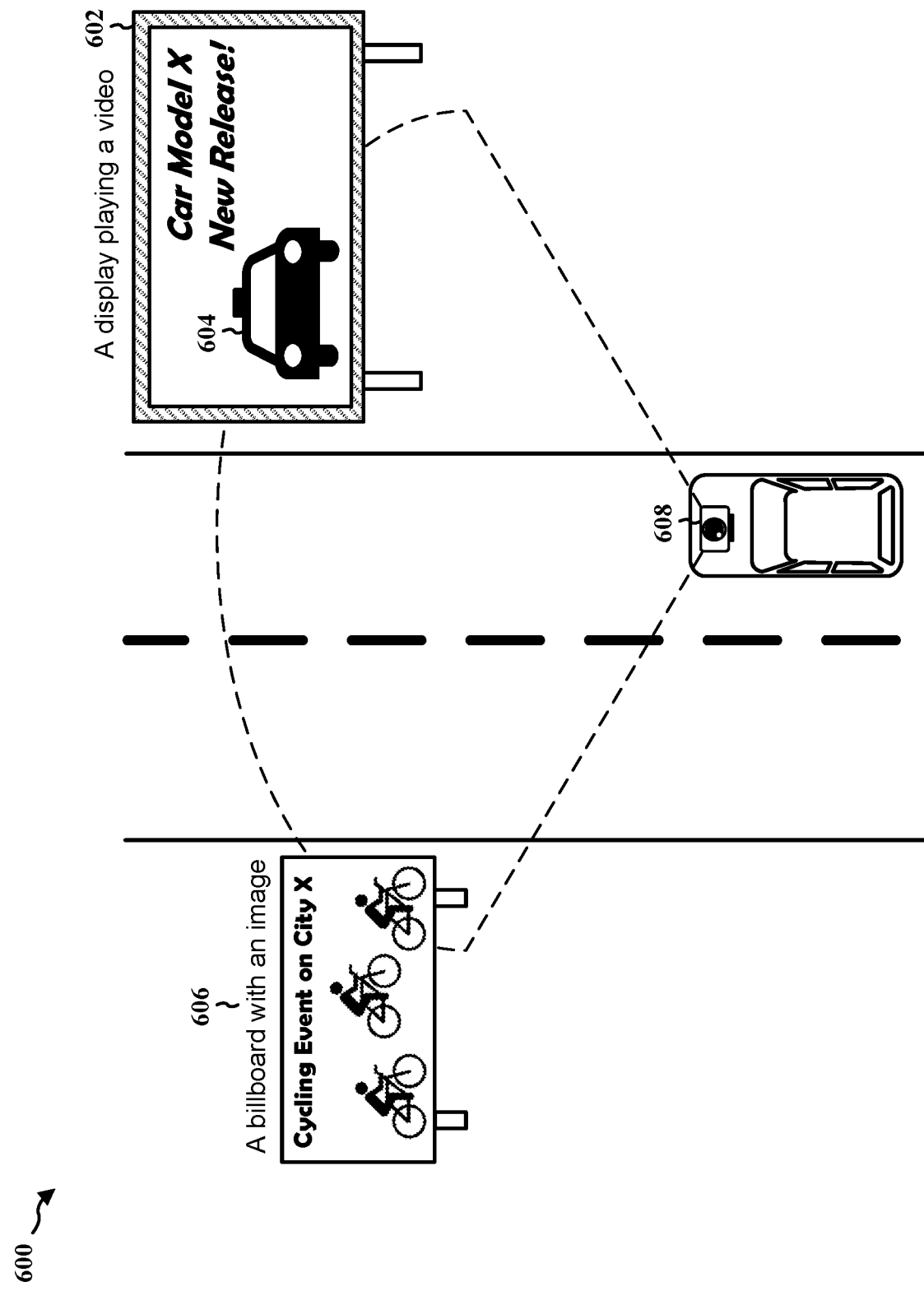
FIG. 6 is a diagram illustrating an example unintentional spoofing in accordance with various aspects of the present disclosure.

FIG. 6 is a diagram 600 illustrating an example unintentional spoofing in accordance with various aspects of the present disclosure. In one example, unintentional spoofing may refer to a camera (or a sensor) extracting misleading/ incorrect features from images/videos captured by the camera. For example, as shown at 602, a display (e.g., a large screen) on a side of a road may be playing a video that includes virtual objects, such as a car 604, and as shown at 606, a billboard on another side of the road may also be showing an image with virtual objects, such as multiple cyclists. In some scenarios, these virtual objects may be recognized and tracked by a camera 608 of a vehicle to be real objects, which may introduce misleading features to the positioning/security system of the vehicle. For example, the camera 608 may determine that the car 604 in the display is a real car on the road and/or that the cyclists on the billboard are real cyclists on the road, and the camera 608 may feed this incorrect information to the positioning/security system of the vehicle. This may cause the positioning/security system to perform inaccurate and unsafe operations, such as slowing down or stopping the vehicle.

Figure 7:
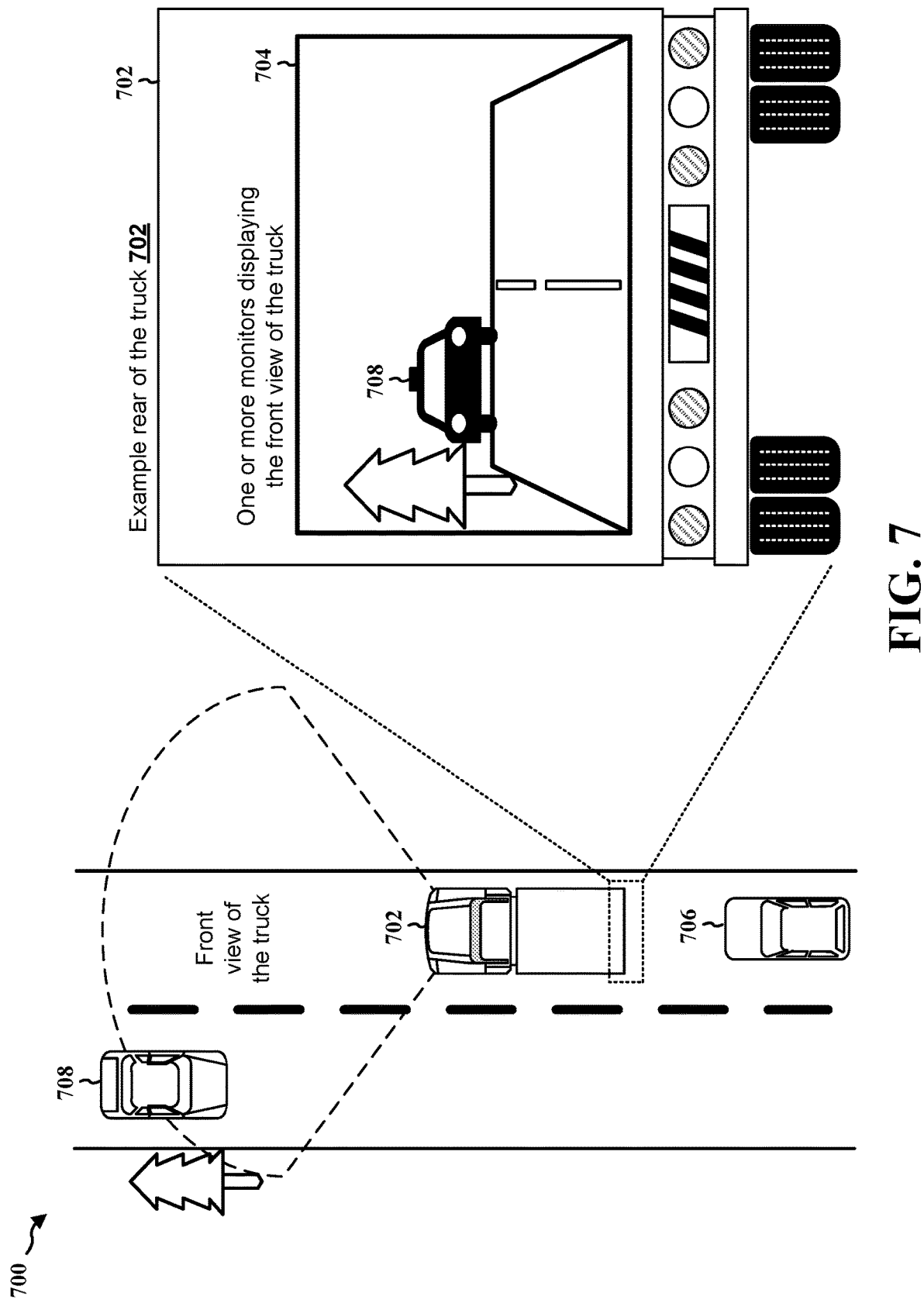
FIG. 7 is a diagram illustrating an example intentional spoofing in accordance with various aspects of the present disclosure.
Figure 8:
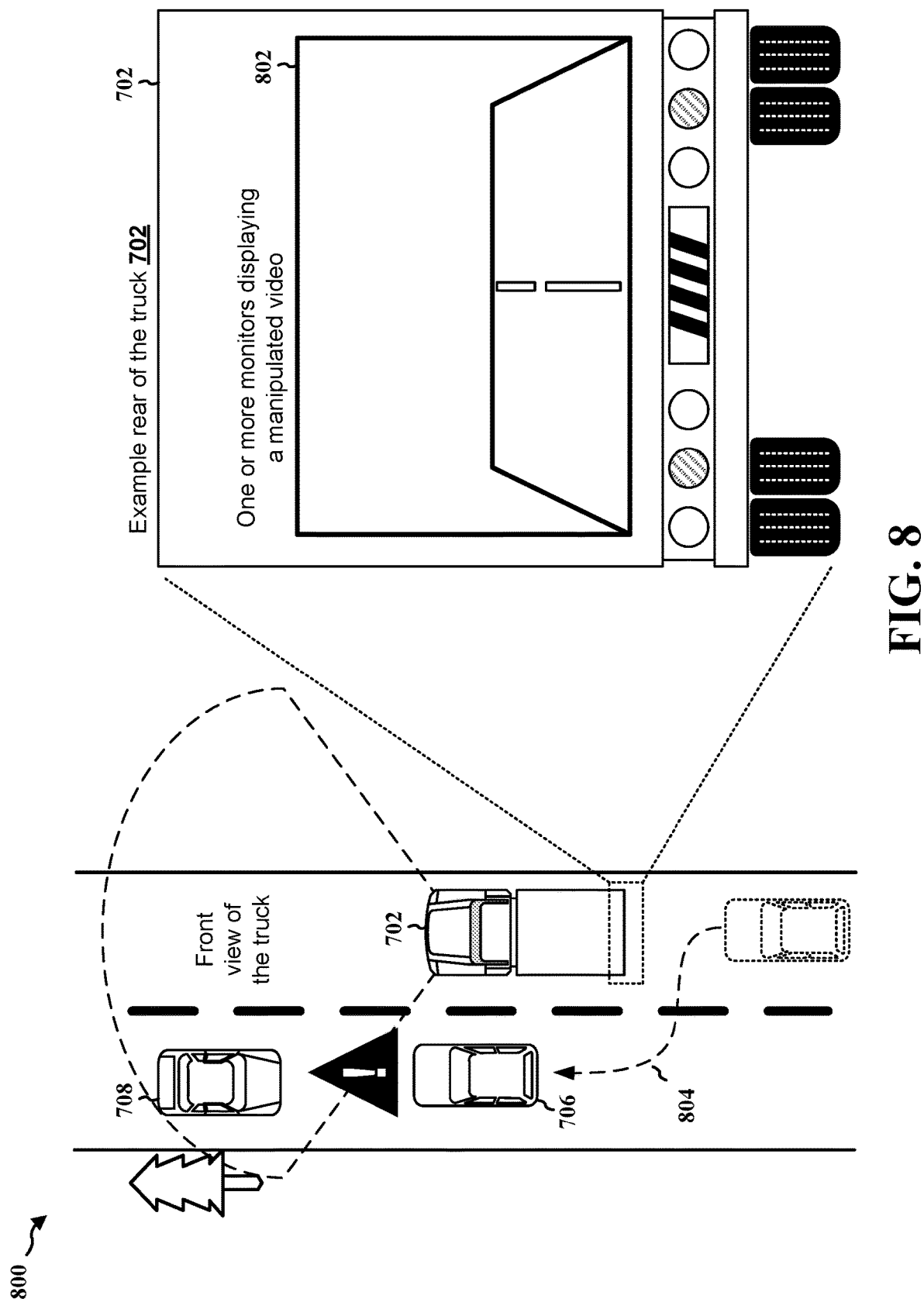
FIG. 8 is a diagram illustrating an example intentional spoofing in accordance with various aspects of the present disclosure.

FIGS. 7 and 8 are diagrams 700 and 800, respectively, illustrating an example intentional spoofing in accordance with various aspects of the present disclosure. In one example, intentional spoofing may refer to a spoofer intentionally manipulating and broadcasting virtual images in a video. When a spoofer is trying to intentionally spoof the image source for a vision-aided positioning system, the camera of the vision-aided positioning system may not be able to see the actual sounding context. Instead, virtual images or manipulated images may take over the camera's field of view (FOV). In one example, intentional spoofing may occur when a spoofer directly mounting a projector in front of the camera to enforce a virtual image and/or video with manipulated reality, where the video may be a real-time video or a pre-recorded video. In another example, intentional spoofing may occur when a big screen on the back of a truck is broadcasting images that are distorted or revised (e.g., adding non-existing landmark, removing existing landmark, etc.), such that the vehicle (or its vision-aided positioning system) behind the truck may capture wrong information based on the FOV of the front camera.

For example, as shown by the diagram 700 of FIG. 7, a truck 702 may include a safety feature that is capable of capturing front view of the truck 702 (e.g., via a front camera) and displaying the captured front view at the rear of the truck 702 via one or more monitors, such as shown at 704. The displaying of the front view of the truck 702 may provide drivers behind the truck 702, such as the driver of a vehicle 706, a view of what is going on ahead of the truck 702, which may greatly improve the road safety. For example, the driver of the vehicle 706 may not be able to see the traffic condition in front of the truck 702 as its view may be blocked by the truck 702. Thus, the driver of the vehicle 706 may not be able to determine whether it is safe to overtake the truck 702. However, by enabling the truck 702 to display its front view at the rear of the truck 702, the driver of the vehicle 706 may make a more informed decision when overtaking the truck 702. For example, as shown at 704, if the driver of the vehicle 706 sees that there is another vehicle 708 on the opposite lane, the driver may know it is unsafe to overtake the truck 702. In another example, such safety feature may also reduce the risk of accidents caused by sudden braking or animals crossing the road.

However, as shown by the diagram 800 of FIG. 8, a spoofer may intentionally spoof (e.g., hijack) the image source (e.g., the front camera) of the truck 702, which may cause the truck 702 to display a manipulated/incorrect video (e.g., a pre-recorded video, a real-time video from a different road, etc.) on the monitor(s) of the truck 702. For example, as shown at 802, if the image source of the truck 702 is spoofed, instead of showing the current front view of the truck 702 that includes the vehicle 708 approaching on the opposite lane, the monitor at the rear of the truck 702 may display a video that does not include the vehicle 708. Thus, as shown at 804, if the driver of the vehicle 706 tries to overtake the truck 702 by believing the manipulated video (e.g., that there are no vehicles ahead of the truck 702), the vehicle 706 may collide with the vehicle 708 during the overtake, which may result in a serious accident.

Aspects presented herein provide various anti-spoofing mechanisms/solutions that may improve the safety and reliability for camera-based positioning and/or camera-aided positioning. Aspects presented herein may enable a UE to identify whether images captured by the camera of the UE are spoofed (e.g., are real images or false/manipulated/virtual images, etc.).

In one aspect of the present disclosure, a UE may verify whether images captured by its camera(s) are spoofed based on comparing the captured images with images from a map database (e.g., a map database that provides high-definition (HD) maps). If the captured images for a given area have one or more components/features different from the images from the map database for the same given area, then the UE may determine that the captured images are likely spoofed. In addition, the UE may store or output an indication of the spoofed images to other entities (e.g., a positioning engine, a location server, etc.), such that other entities may be aware of the spoofed images. Also, after the UE determines that its captured images are spoofed, the UE may perform camera-based positioning and/or camera-aided positioning without the spoofed images/features. Aspects presented herein may apply to (and benefit) vision enhanced, vision-based, and vision-aided positioning, augmented reality (AR), virtual reality (VR), and extended reality (XR) glasses, automotive camera perception, autonomous driving, and vision-enhanced positioning and navigation in smartphones.

Figure 9A:
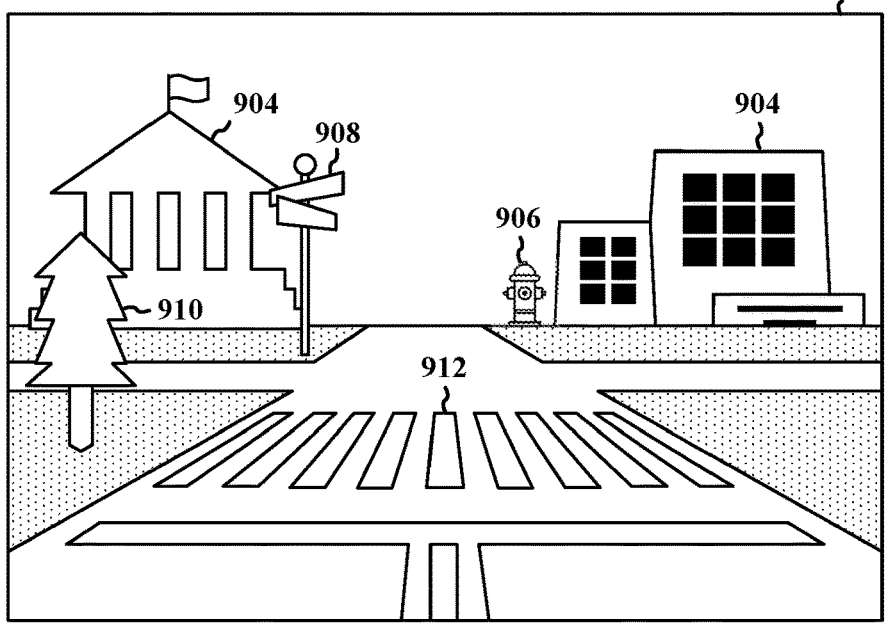
FIG. 9A is a diagram illustrating an example image from a map database in accordance with various aspects of the present disclosure.

FIG. 9A is a diagram 900A illustrating an example image from a map database (e.g., a HD map database) in accordance with various aspects of the present disclosure. In one example, images from a map database may include invariant components (which may also be referred to as invariant features) and variant components. Invariant components/features may refer to objects (e.g., in a real world) that are likely to be invariant (e.g., remain unchanged) for a relatively long time. For example, as shown at 902, the buildings 904, the fire hydrant 906, and/or the road sign 908 are likely to be considered as invariant components as they are more likely to remain unchanged for a relatively long time. On the other hand, the tree 910, the crosswalk 912, and/or the colors of the buildings 904, the fire hydrant 906 and the road sign 908 are likely to be variant components as they may change after a shorter period of time compared to the invariant components. For example, leaves of the tree 910 may fall or change color at different seasons, the shape, location, or color of the crosswalk 912 may change after a repaint, and the color of the buildings 904 may fade after a period of time, etc.

In one aspect, when a UE is configured to verify whether images captured by its camera at a location are likely spoofed, the UE may obtain (e.g., download) images associated with that location from a map database, such as shown by the diagram 900A of FIG. 9A. In some examples, as obtaining images from the map database map specify high communication resources, the UE may be configured to trigger this image verification procedure when the uncertainty of UE's 6D solution (e.g., position and pose) is below a specified uncertainty threshold. For example, the UE may trigger this image verification procedure when the UE determines that its positioning uncertainty is below X meters (e.g., positioning uncertainty <5 meters), and/or that its heading uncertainty is below Y degrees (e.g., heading uncertainty <10 degrees), etc.

Figure 9B:
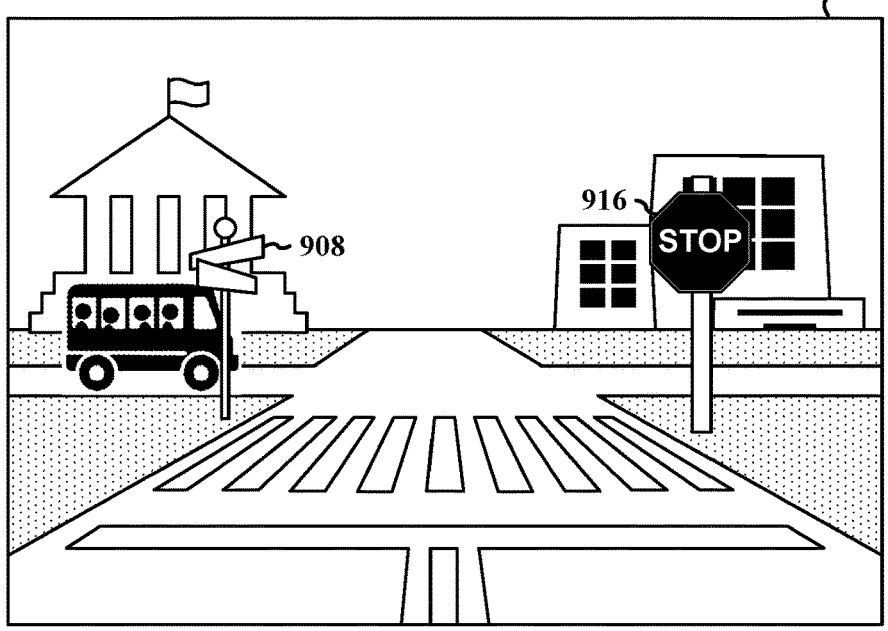
FIG. 9B is a diagram illustrating an example spoofed image in accordance with various aspects of the present disclosure.

FIG. 9B is a diagram 900B illustrating an example spoofed image in accordance with various aspects of the present disclosure. After obtaining images from the map database, the UE may validate overall consistency between images from the map database with its captured images (or with the UE's camera vision). If the images captured by the UE are spoofed, they may include (or not include) features that match with the images from the map database. For example, as shown at 914, the spoofed image may include a stop sign 916 (which may be referred to as a spoofed feature) that does not exist in the images from the map database (e.g., as shown by the diagram 900A), and/or that the spoofed image may not include the fire hydrant 906 that is in the images from the map database, etc. Thus, based on the comparison/validation, the UE may determine whether the captured images (or its camera vision) are likely spoofed.

In one example, the UE may be configured to perform the comparison/validation between its captured images and images from the map database based on a specified order, which may be based on a level of certainty/accuracy specified (e.g., additional/more steps are performed for the high-level certainty/accuracy). For example, the UE may be configured to perform an object expectation check first, where the UE may check whether invariant components/features identified in its captured images also exist in images from the map database (e.g., the existence of the buildings 904, the fire hydrant 906, and/or the road sign 908, etc.).

If the object expectation check passes (e.g., the invariant components/features identified in its captured images exist in the images from the map database), then the UE may be configured to perform an object location check next, where the UE may check if the location of one or more selected components/features from its captured images is consistent with images from the map database (e.g., is within a distance threshold). In other words, the UE may check whether invariant components/features are at correct locations. For example, as shown at 916, the road sign 908 in the spoofed image may be at a different location. If the UE determines that the road sign 908 in its captured images is more than X centimeters/meters compared to the road sign 908 in the images from the map database (e.g., as shown by the diagram 900A) (e.g., the location error of road sign 908>50 cm), the UE may determine that its captured images (or its camera vision) are likely spoofed. Similarly, the UE may store or output an indication of the spoofed images to other entities (e.g., a positioning engine, a location server, etc.), such that other entities may be aware of the spoofed images. After the UE determines that its captured images are spoofed, the UE may perform camera-based positioning and/or camera-aided positioning without the spoofed images/features.

If the object location check also passes (e.g., the locations of the invariant components/features identified in its captured images are within the distance threshold compared to the images from the map database), then the UE may be further configured to perform an object property check, where the UE may check if other object properties, such as variant components/features (e.g., shape, size, color, etc.) in its captured images also match with images from the map database. For example, the UE may compare whether the colors of the buildings 904 or the fire hydrant 906 are consistent with the images from the map database. If the colors are different (e.g., by a threshold), then the UE may determine that its captured images are likely spoofed. Similarly, the UE may store or output an indication of the spoofed images to other entities (e.g., a positioning engine, a location server, etc.), such that other entities may be aware of the spoofed images. After the UE determines that its captured images are spoofed, the UE may perform camera-based positioning and/or camera-aided positioning without the spoofed images/features. On the other hand, if the colors are also consistent, then the UE may determine that its captured images (or its camera vision) are not spoofed. Then the UE may continue to perform the camera-based positioning and/or the camera-aided positioning using its camera(s). In another example, if the UE is travelling on a road or in a tunnel, the UE may check if the road heading is consistent straight, where a spoofing event may be detected by the UE if its camera vision is feeding back a curve road.

In another aspect of the present disclosure, a UE may verify whether images captured by its camera are spoofed based on changing the sampling rate of its camera. When a camera is operating at a sampling rate that is higher than the display rate (or refresh rate) of a video, certain patterns or observations may indicate that images captured by the UE are virtual images (instead of natural light reflected from actual objects). This method may be used for detecting all types of virtual images regardless they are spoofing or not.

Figure 10A:
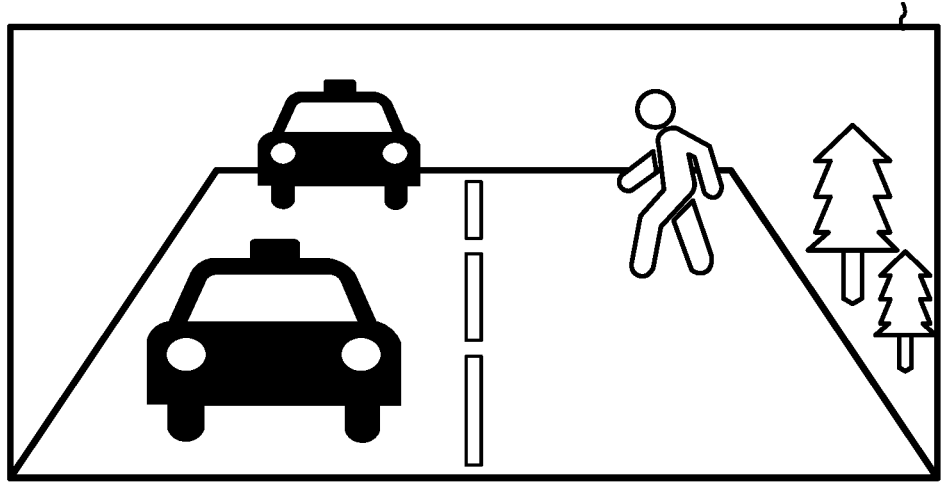
FIG. 10A is a diagram illustrating an example image captured from an actual environment by a camera in accordance with various aspects of the present disclosure.

FIG. 10A is a diagram 1000A illustrating an example image captured from an actual environment by a camera (e.g., based on natural light reflected from actual objects) in accordance with various aspects of the present disclosure. As shown at 1002, images captured by a camera from an actual environment may clearly depict objects in the environment.

Figure 10B:
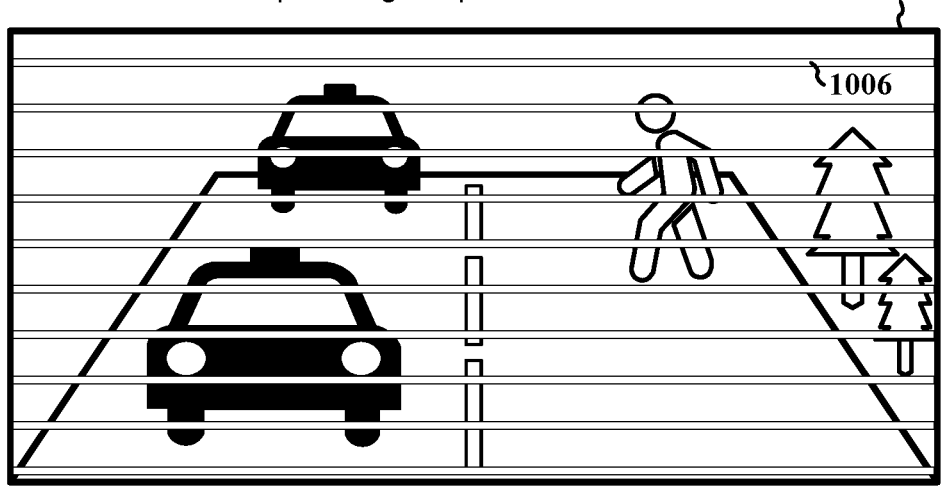
FIG. 10B is a diagram illustrating an example image captured from a video displayed at a lower display rate compared to the sampling rate of the camera in accordance with various aspects of the present disclosure.

FIG. 10B is a diagram 1000B illustrating an example image captured from a video displayed at a lower display/refresh rate compared to the sampling rate of the camera in accordance with various aspects of the present disclosure. On the other hand, as shown at 1004, images captured from a video (e.g., from a display as shown at 602 of FIG. 6) may include "blank gaps" 1006, which may be used by the UE to identify that its captured images are likely associated with virtual images/objects. Thus, the UE may determine that its captured images (or its camera vision) are likely spoofed if the captured images show certain patterns or observations (e.g., blank gaps, flashing, distorted, etc.) that may occur when the camera is operating at a higher sampling rate faster than the display/refresh rate of a video.

In another aspect of the present disclosure, a UE may verify whether images captured by a camera are spoofed by crosschecking the captured images with images captured by other camera(s) of the UE (or from another UE), and/or by changing the focal length of its camera. For example, referring back to FIG. 5, a UE (e.g., the vehicle 502) may include multiple cameras, where the UE may verify whether images captured by one of its cameras (e.g., the FOV of the rear camera 508) are spoofed by comparing the captured images with images captured by another camera(s) (e.g., the FOVs of the side cameras 506). Such crosschecking mechanism may enable the UE to detect whether images captured by its camera(s) are based on virtual images (e.g., a video re-broadcast with slow rotation). If the crosscheck shows an inconsistency (e.g., a large inconsistency), it may indicate that a potential image or virtual feature spoofing event occurs. Similarly, the UE may store or output an indication of the spoofed images to other entities (e.g., a positioning engine, a location server, etc.), such that other entities may be aware of the spoofed images. After the UE determines that its captured images are spoofed, the UE may perform camera-based positioning and/or camera-aided positioning without the spoofed images/features. However, if the images are not spoofed, then the UE may continue to perform the camera-based positioning and/or the camera-aided positioning using its camera(s).

In one example, if multiple cameras or FOVs are available, a UE may derive/estimate its 6D pose (which may also be referred to as the IMU pose in some examples) based on the vision of each camera/FOV separately. Then, the UE may crosscheck/compare the derived/estimated 6D poses from different cameras/FOVs to determine whether there are inconsistencies. For example, if the 6D pose derived based on the vision of the rear camera is different from the 6D pose derived based on the vision of a side camera and/or based on the vision of a front camera, the UE may determine that that images captured by the rear camera are spoofed. Similarly, the UE may store or output an indication of the spoofed images to other entities (e.g., a positioning engine, a location server, etc.), such that other entities may be aware of the spoofed images. After the UE determines that its captured images are spoofed, the UE may perform camera-based positioning and/or camera-aided positioning without the spoofed images/features. However, if the images are not spoofed, then the UE may continue to perform the camera-based positioning and/or the camera-aided positioning using its camera(s). In another example, when a monostatic camera is used (e.g., meaning a single camera is used but is able to provide multiple FOVs), a UE may change the FOV of the camera to detect or eliminate potential virtual image spoofing. This may also improve power optimization for the camera.

In another aspect of the present disclosure, a UE may verify whether images captured by its camera are spoofed by changing the focal length of the camera. For example, the UE may change the focal length of its camera by zooming-in (e.g., making the images captured by the camera appear to be larger and nearer) and/or by zooming-out (e.g., making the images captured by the camera appear to be smaller and farther away). The locations of one or more features (e.g., objects) captured by the camera and/or their distances from the UE derived from a vision-aided positioning engine (PE) (e.g., based on sensor fusion positioning: GNSS+IMU+camera) may remain the same if the focal length of the camera is changed. Thus, if a feature/object is virtually spoofed (e.g., the stop sign 916 in FIG. 9B), the location or distance of the feature/object may also change with the focal length adjustment.

In another aspect of the present disclosure, a UE may verify whether images captured by its camera are spoofed based on performing geometry check for one or more objects in the captured images using additional sensor(s).

In one example, based on vision-based or vision-aided positioning, a UE may be able to identify distances of one or more objects/features from the UE. For example, referring back to FIG. 9A, the UE may be able to identify the distance of the fire hydrant 906 and/or the distance of the road sign 908 from the UE based on vision-based or vision-aided positioning. If the UE also includes others sensor(s), such as a radar and/or a light detection and ranging (Lidar), the UE may also estimate the physical distance of the fire hydrant 906 and/or the distance of the road sign 908 from the UE using these sensor(s). If there are inconsistencies in the distances of the one or more objects/features derived from the vision-based or vision-aided positioning and from the other sensor(s), it may indicate that the images captured by the camera are likely virtually generated or inaccurate (e.g., as shown by FIG. 9B). In other words, an object/feature's physical distance may be estimated in the vision-aid positioning engine based on focal length (e.g., image depth). If it is from a virtual object, the physical distance check may not pass.

In another example, based on vision-based or vision-aided positioning, a UE may also be able to identify the velocity of one or more objects/features. For example, referring back to FIG. 7, the truck 702 may be able to identify the speed of the vehicle 708 based on vision-based or vision-aided positioning. If the truck 702 also includes others sensor(s), such as a radar and/or a Lidar, the truck 702 may also estimate the velocity of the vehicle 708 using these sensors. If there is an inconsistency in the velocity of the vehicle 708 derived from the vision-based or vision-aided positioning and from the other sensor(s), it may indicate that the images captured by the camera of the truck 702 are likely virtual generated or inaccurate (e.g., as shown by FIG. 8). In other words, if the relative velocity between a UE and an object/feature does not match the relative velocity derived from the UE (e.g., GNSS+IMU+camera), it is possible that the object/feature is virtually created.

In another example, a UE may be able to identify whether one or more objects captured by its camera are virtual objects by checking the shape of the one or more objects. In some examples, the UE may identify the shape of an object using a radar and/or a Lidar. For example, referring back to FIG. 6, the shape of the car 604 from the video (e.g., as shown at 602) and/or the shape of the cyclists from the billboard (e.g., as shown at 606) are likely to be flat (e.g., a flat screen shape, a flat rectangle shape, etc.), which may be different from the shape of the real object (e.g., the shape of a real car, the shape of a real cyclist, etc.). Thus, the UE may determine that an object is likely a virtual object if the shape of the object identified by its sensor is different from the actual object, and/or the UE may also determine that images captured by its camera are likely spoofed.

Figure 11:
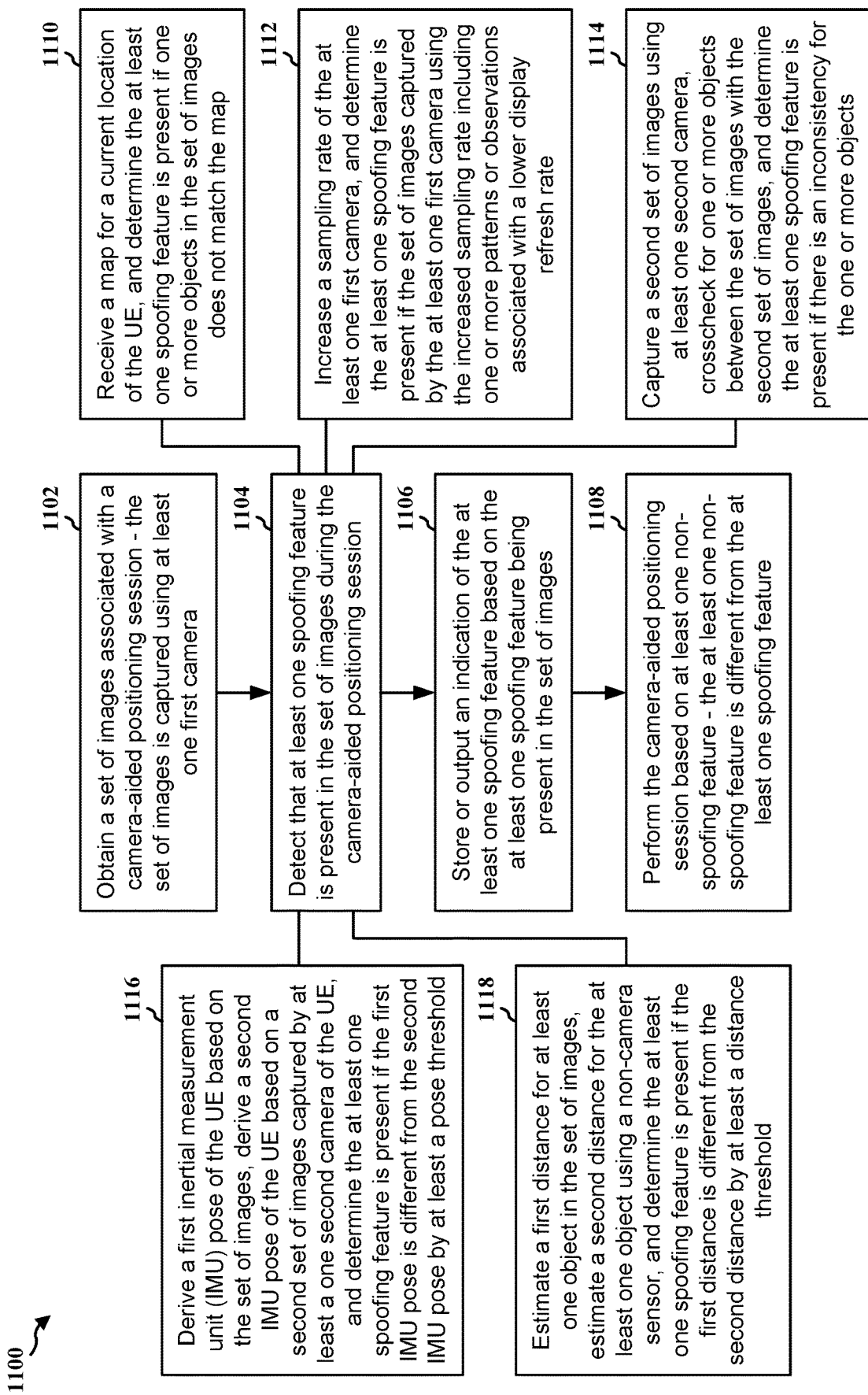
FIG. 11 is a flowchart of a method of wireless communication.

FIG. 11 is a flowchart 1100 of a method of wireless communication. The method may be performed by a UE (e.g., the UE 104, 404, 902; the vehicle 502; the truck 702; the apparatus 1304). The method may enable the UE to identify whether images captured by the camera(s) of the UE are spoofed (e.g., are real images or false/manipulated/virtual images, etc.).

At 1102, the UE may obtain a set of images associated with a camera-aided positioning session, where the set of images is captured using at least one first camera, such as described in connection with FIG. 5. For example, as shown at 510, the front camera 504 of the vehicle 502 may obtain a set of images for a camera-aided positioning session (e.g., GNSS+Camera). The obtaining of the set of images may be performed by, e.g., the camera aided positioning component 198, the camera 1332, the application processor 1306, the cellular baseband processor 1324, and/or the transceiver(s) 1322 of the apparatus 1304 in FIG. 13.

In one example, the camera-aided positioning session may be associated with an absolute position of the UE, a relative position of the UE, an orientation of the UE, or a combination thereof.

At 1104, the UE may detect that at least one spoofing feature is present in the set of images during the camera-aided positioning session, such as described in connection with FIGS. 9A, 9B, 10A, and 10B. For example, as described in connection with FIGS. 9A and 9B, a UE may detect that at least one spoofing feature (e.g., the stop sign 916) is presented in the images captured by the UE by comparing the captured images with images form a map data. The detection of the at least one spoofing feature may be performed by, e.g., the camera aided positioning component 198, the camera 1332, the application processor 1306, the cellular baseband processor 1324, and/or the transceiver(s) 1322 of the apparatus 1304 in FIG. 13.

In one example, to detect that the at least one spoofing feature is present in the set of images, the UE may estimate a first distance for at least one object in the set of images, adjust a focal length of the at least one first camera, capture a second set of images using the at least one first camera based on the adjusted focal length, estimate a second distance for the at least one object based on the second set of images, and determine the at least one spoofing feature is present if the first distance is different from the second distance by at least a distance threshold.

In another example, to detect that the at least one spoofing feature is present in the set of images, the UE may estimate a first velocity for at least one object in the set of images, estimate a second velocity for the at least one object using a non-camera sensor, and determine the at least one spoofing feature is present if the first velocity is different from the second velocity by at least a velocity threshold.

In another example, to detect that that the at least one spoofing feature is present in the set of images, the UE may estimate a first shape for at least one object in the set of images, estimate a second shape for the at least one object using a non-camera sensor, and determine the at least one spoofing feature is present if the first shape is different from the second shape.

At 1106, the UE may store or output an indication of the at least one spoofing feature based on the at least one spoofing feature being present in the set of images, such as described in connection with FIGS. 9A, 9B, 10A, and 10B. For example, as shown at 510, UE may store or output an indication of the spoofed images to other entities (e.g., a positioning engine, a location server, etc.), such that other entities may be aware of the spoofed images. The storing or outputting of the indication of the at least one spoofing feature may be performed by, e.g., the camera aided positioning component 198, the camera 1332, the application processor 1306, the cellular baseband processor 1324, and/or the transceiver(s) 1322 of the apparatus 1304 in FIG. 13.

At 1108, the UE may perform the camera-aided positioning session based on at least one non-spoofing feature, where the at least one non-spoofing feature is different from the at least one spoofing feature, such as described in connection with FIGS. 5, 9A, 9B, 10A, and 10B. For example, as described in connection with FIGS. 9A and 9B, after the UE determines that its captured images are spoofed, the UE may perform camera-based positioning and/or camera-aided positioning without the spoofed images/features. However, if the images are not spoofed, then the UE may continue to perform the camera-based positioning and/or the camera-aided positioning using its camera(s). The performing of the camera-aided positioning session based on at least one non-spoofing feature may be performed by, e.g., the camera aided positioning component 198, the camera 1332, the application processor 1306, the cellular baseband processor 1324, and/or the transceiver(s) 1322 of the apparatus 1304 in FIG. 13.

In one example, as shown at 1110, the UE may receive a map for a current location of the UE, and determine the at least one spoofing feature is present if one or more objects in the set of images does not match the map, such as described in connection with FIGS. 9A and 9B. For example, as described in connection with FIGS. 9A and 9B, the UE may receive images associated with current location of the UE from a map database, and the UE may compare its captured images with the images from the map database to determine whether its captured images are spoofed or include spoofing feature(s)/object(s). The reception of the map may be performed by, e.g., the camera aided positioning component 198, the camera 1332, the application processor 1306, the cellular baseband processor 1324, and/or the transceiver(s) 1322 of the apparatus 1304 in FIG. 13.

In one implementation, the UE may determine an uncertainty associated with a position or a pose of the UE is below a threshold, where the map is received in response to the uncertainty being below the threshold.

In another implementation, to determine the at least one spoofing feature is present if the one or more objects in the set of images does not match the map, the UE may extract a set of invariant features from the set of images, and the UE may determine the at least one spoofing feature is present if one or more invariant features in the set of invariant features do not exist in the map.

In another implementation, to determine the at least one spoofing feature is present if the one or more objects in the set of images does not match the map, the UE may extract a set of features from the set of images, and the UE may determine the at least one spoofing feature is present if one or more features in the set of features are not located at corresponding locations that are within a location error threshold.

In another implementation, to determine the at least one spoofing feature is present if the one or more objects in the set of images does not match the map, the UE may extract a set of properties for the one or more objects from the set of images, and the UE may determine the at least one spoofing feature is present if the set of properties do not exist in the map. In some implementations, the set of properties may correspond to at least one of: a shape of the one or more objects, a size of the one or more objects, or a color of the one or more objects.

In another example, as shown at 1112, the UE may increase a sampling rate of the at least one first camera, and determine the at least one spoofing feature is present if the set of images captured by the at least one first camera using the increased sampling rate including one or more patterns or observations associated with a lower display refresh rate, such as described in connection with FIGS. 9A and 9B. For example, as described in connection with FIGS. 9A and 9B, the UE may increase the sampling rate of its camera(s), and determine that its captured images are spoofed or include virtual object(s) if the captured images show blank gaps 1006. The increasing of the sampling rate and/or the determination of the at least one spoofing feature is present may be performed by, e.g., the camera aided positioning component 198, the camera 1332, the application processor 1306, the cellular baseband processor 1324, and/or transceiver(s) 1322 of the apparatus 1304 in FIG. 13.

In another example, as shown at 1114, the UE may capture a second set of images using at least one second camera, crosscheck for one or more objects between the set of images with the second set of images, and determine the at least one spoofing feature is present if there is an inconsistency for the one or more objects, such as described in connection with FIG. 5. For example, the UE may verify whether images captured by one of its cameras (e.g., the FOV of the rear camera 508) are spoofed by comparing the captured images with images captured by another camera(s) (e.g., the FOVs of the side cameras 506). The crosschecking for one or more objects between the set of images with the second set of images and/or the determination of the at least one spoofing feature is present may be performed by, e.g., the camera aided positioning component 198, the camera 1332, the application processor 1306, the cellular baseband processor 1324, and/or the transceiver(s) 1322 of the apparatus 1304 in FIG. 13.

In another example, as shown at 1116, the UE may derive a first IMU pose of the UE based on the set of images, derive a second IMU pose of the UE based on a second set of images captured by at least a one second camera of the UE, and determine the at least one spoofing feature is present if the first IMU pose is different from the second IMU pose by at least a pose threshold. For example, if multiple cameras or FOVs are available, a UE may derive/estimate its 6D pose (which may also be referred to as the IMU pose in some examples) based on the vision of each camera/FOV separately. Then, the UE may crosscheck/compare the derived/estimated 6D poses from different cameras/FOVs to determine whether there are inconsistencies. For example, if the 6D pose derived based on the vision of the rear camera is different from the 6D pose derived based on the vision of a side camera and/or based on the vision of a front camera, the UE may determine that that images captured by the rear camera are spoofed. The deriving of the IMU pose(s) and/or the determination of the at least one spoofing feature is present may be performed by, e.g., the camera aided positioning component 198, the camera 1332, the application processor 1306, the cellular baseband processor 1324, and/or the transceiver(s) 1322 of the apparatus 1304 in FIG. 13.

In another example, as shown at 1118, the UE may estimate a first distance for at least one object in the set of images, estimate a second distance for the at least one object using a non-camera sensor, and determine the at least one spoofing feature is present if the first distance is different from the second distance by at least a distance threshold, such as described in connection with FIGS. 9A and 9B. For example, as described in connection with FIGS. 9A and 9B, the UE may be able to identify the distance of the fire hydrant 906 and/or the distance of the road sign 908 from the UE based on vision-based or vision-aided positioning. If the UE also includes others sensor(s), such as a radar and/or a Lidar, the UE may also estimate the physical distance of the fire hydrant 906 and/or the distance of the road sign 908 from the UE using these sensors. If there are inconsistencies in distances of the one or more objects/features derived from the vision-based or vision-aided positioning and from the other sensor(s), it may indicate that the images captured by the camera are likely virtual generated or inaccurate (e.g., as shown by FIG. 9B). The estimation of the first distance for at least one object in the set of images, the estimation of the second distance for the at least one object using a non-camera sensor, and/or the determination of the at least one spoofing feature is present may be performed by, e.g., the camera aided positioning component 198, the camera 1332, one or more sensor modules 1318, the application processor 1306, the cellular baseband processor 1324, and/or the transceiver(s) 1322 of the apparatus 1304 in FIG. 13.

In another example, the UE may verify, based on detecting that the at least one spoofing feature is present in the set of images, that the at least one spoofing feature is a valid spoofing feature. Then, to store or output the indication of the at least one spoofing feature, the UE may store or output the indication of the at least one spoofing feature based on verifying that the at least one spoofing feature is the valid spoofing feature.

Figure 12:
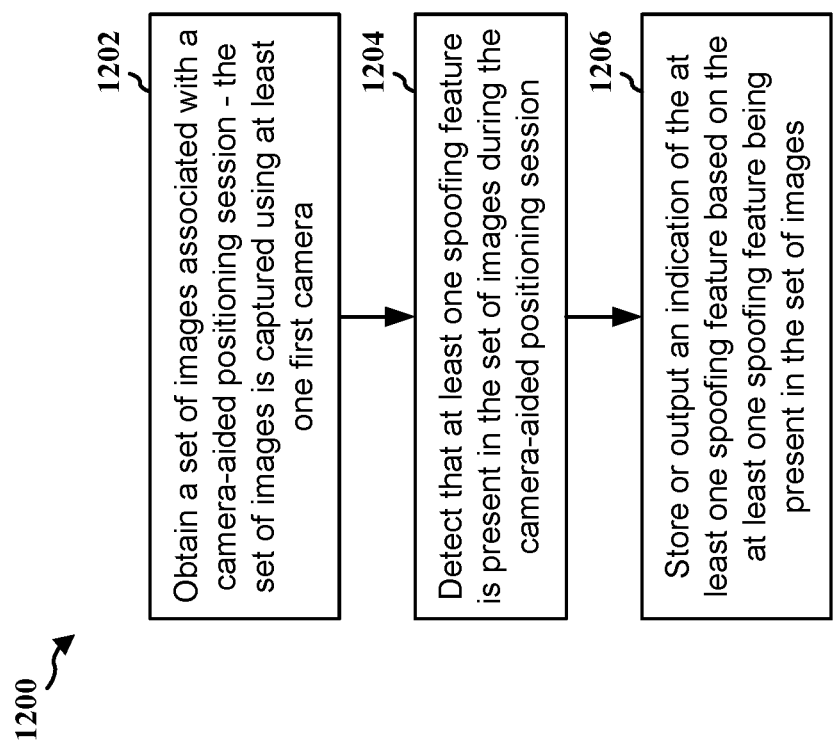
FIG. 12 is a flowchart of a method of wireless communication.

FIG. 12 is a flowchart 1200 of a method of wireless communication. The method may be performed by a UE (e.g., the UE 104, 404, 902; the vehicle 502; the truck 702; the apparatus 1304). The method may enable the UE to identify whether images captured by the camera(s) of the UE are spoofed (e.g., are real images or false/manipulated images, etc.).

At 1202, the UE may obtain a set of images associated with a camera-aided positioning session, where the set of images is captured using at least one first camera, such as described in connection with FIG. 5. For example, as shown at 510, the front camera 504 of the vehicle 502 may obtain a set of images for a camera-aided positioning session (e.g., GNSS+Camera). The obtaining of the set of images may be performed by, e.g., the camera aided positioning component 198, the camera 1332, the application processor 1306, the cellular baseband processor 1324, and/or the transceiver(s) 1322 of the apparatus 1304 in FIG. 13.

In one example, the camera-aided positioning session may be associated with an absolute position of the UE, a relative position of the UE, an orientation of the UE, or a combination thereof.

At 1204, the UE may detect that at least one spoofing feature is present in the set of images during the camera-aided positioning session, such as described in connection with FIGS. 9A, 9B, 10A, and 10B. For example, as described in connection with FIGS. 9A and 9B, a UE may detect that at least one spoofing feature (e.g., the stop sign 916) is presented in the images captured by the UE by comparing the captured images with images form a map data. The detection of the at least one spoofing feature may be performed by, e.g., the camera aided positioning component 198, the camera 1332, the application processor 1306, the cellular baseband processor 1324, and/or the transceiver(s) 1322 of the apparatus 1304 in FIG. 13.

In one example, to detect that the at least one spoofing feature is present in the set of images, the UE may estimate a first distance for at least one object in the set of images, adjust a focal length of the at least one first camera, capture a second set of images using the at least one first camera based on the adjusted focal length, estimate a second distance for the at least one object based on the second set of images, and determine the at least one spoofing feature is present if the first distance is different from the second distance by at least a distance threshold.

In another example, to detect that the at least one spoofing feature is present in the set of images, the UE may estimate a first velocity for at least one object in the set of images, estimate a second velocity for the at least one object using a non-camera sensor, and determine the at least one spoofing feature is present if the first velocity is different from the second velocity by at least a velocity threshold.

In another example, to detect that that the at least one spoofing feature is present in the set of images, the UE may estimate a first shape for at least one object in the set of images, estimate a second shape for the at least one object using a non-camera sensor, and determine the at least one spoofing feature is present if the first shape is different from the second shape.

At 1206, the UE may store or output an indication of the at least one spoofing feature based on the at least one spoofing feature being present in the set of images, such as described in connection with FIGS. 9A, 9B, 10A, and 10B. For example, as shown at 510, UE may store or output an indication of the spoofed images to other entities (e.g., a positioning engine, a location server, etc.), such that other entities may be aware of the spoofed images. The storing or outputting of the indication of the at least one spoofing feature may be performed by, e.g., the camera aided positioning component 198, the camera 1332, the application processor 1306, the cellular baseband processor 1324, and/or the transceiver(s) 1322 of the apparatus 1304 in FIG. 13.

In one example, at 1208, the UE may perform the camera-aided positioning session based on at least one non-spoofing feature, where the at least one non-spoofing feature is different from the at least one spoofing feature, such as described in connection with FIGS. 5, 9A, 9B, 10A, and 10B. For example, as described in connection with FIGS. 9A and 9B, after the UE determines that its captured images are spoofed, the UE may perform camera-based positioning and/or camera-aided positioning without the spoofed images/features. However, if the images are not spoofed, then the UE may continue to perform the camera-based positioning and/or the camera-aided positioning using its camera(s). The performing of the camera-aided positioning session based on at least one non-spoofing feature may be performed by, e.g., the camera aided positioning component 198, the camera 1332, the application processor 1306, the cellular baseband processor 1324, and/or the transceiver(s) 1322 of the apparatus 1304 in FIG. 13.

In another example, the UE may receive a map for a current location of the UE, and determine the at least one spoofing feature is present if one or more objects in the set of images does not match the map, such as described in connection with FIGS. 9A and 9B. For example, as described in connection with FIGS. 9A and 9B, the UE may receive images associated with current location of the UE from a map database, and the UE may compare its captured images with the images from the map database to determine whether its captured images are spoofed or include spoofing feature(s)/object(s). The reception of the map may be performed by, e.g., the camera aided positioning component 198, the camera 1332, the application processor 1306, the cellular baseband processor 1324, and/or the transceiver(s) 1322 of the apparatus 1304 in FIG. 13. In one implementation, the UE may determine an uncertainty associated with a position or a pose of the UE is below a threshold, where the map is received in response to the uncertainty being below the threshold. In another implementation, to determine the at least one spoofing feature is present if the one or more objects in the set of images does not match the map, the UE may extract a set of invariant features from the set of images, and the UE may determine the at least one spoofing feature is present if one or more invariant features in the set of invariant features do not exist in the map. In another implementation, to determine the at least one spoofing feature is present if the one or more objects in the set of images does not match the map, the UE may extract a set of features from the set of images, and the UE may determine the at least one spoofing feature is present if one or more features in the set of features are not located at corresponding locations that are within a location error threshold. In another implementation, to determine the at least one spoofing feature is present if the one or more objects in the set of images does not match the map, the UE may extract a set of properties for the one or more objects from the set of images, and the UE may determine the at least one spoofing feature is present if the set of properties do not exist in the map. In some implementations, the set of properties may correspond to at least one of: a shape of the one or more objects, a size of the one or more objects, or a color of the one or more objects.

In another example, the UE may increase a sampling rate of the at least one first camera, and determine the at least one spoofing feature is present if the set of images captured by the at least one first camera using the increased sampling rate including one or more patterns or observations associated with a lower display refresh rate, such as described in connection with FIGS. 9A and 9B. For example, as described in connection with FIGS. 9A and 9B, the UE may increase the sampling rate of its camera(s), and determine that its captured images are spoofed or include virtual object(s) if the captured images show blank gaps 1006. The increasing of the sampling rate and/or the determination of the at least one spoofing feature is present may be performed by, e.g., the camera aided positioning component 198, the camera 1332, the application processor 1306, the cellular baseband processor 1324, and/or the transceiver(s) 1322 of the apparatus 1304 in FIG. 13.

In another example, the UE may capture a second set of images using at least one second camera, crosscheck for one or more objects between the set of images with the second set of images, and determine the at least one spoofing feature is present if there is an inconsistency for the one or more objects, such as described in connection with FIG. 5. For example, the UE may verify whether images captured by one of its cameras (e.g., the FOV of the rear camera 508) are spoofed by comparing the captured images with images captured by another camera(s) (e.g., the FOVs of the side cameras 506). The crosschecking for one or more objects between the set of images with the second set of images and/or the determination of the at least one spoofing feature is present may be performed by, e.g., the camera aided positioning component 198, the camera 1332, the application processor 1306, the cellular baseband processor 1324, and/or the transceiver(s) 1322 of the apparatus 1304 in FIG. 13.

In another example, the UE may derive a first IU pose of the UE based on the set of images, derive a second IMU pose of the UE based on a second set of images captured by at least a one second camera of the UE, and determine the at least one spoofing feature is present if the first IMU pose is different from the second IMU pose by at least a pose threshold. For example, if multiple cameras or FOVs are available, a UE may derive/estimate its 6D pose (which may also be referred to as the IMU pose in some examples) based on the vision of each camera/FOV separately. Then, the UE may crosscheck/compare the derived/estimated 6D poses from different cameras/FOVs to determine whether there are inconsistencies. For example, if the 6D pose derived based on the vision of the rear camera is different from the 6D pose derived based on the vision of a side camera and/or based on the vision of a front camera, the UE may determine that that images captured by the rear camera are spoofed. The deriving of the IMU pose(s) and/or the determination of the at least one spoofing feature is present may be performed by, e.g., the camera aided positioning component 198, the camera 1332, the application processor 1306, the cellular baseband processor 1324, and/or the transceiver(s) 1322 of the apparatus 1304 in FIG. 13.

In another example, the UE may estimate a first distance for at least one object in the set of images, estimate a second distance for the at least one object using a non-camera sensor, and determine the at least one spoofing feature is present if the first distance is different from the second distance by at least a distance threshold, such as described in connection with FIGS. 9A and 9B. For example, as described in connection with FIGS. 9A and 9B, the UE may be able to identify the distance of the fire hydrant 906 and/or the distance of the road sign 908 from the UE based on vision-based or vision-aided positioning. If the UE also includes others sensor(s), such as a radar and/or a Lidar, the UE may also estimate the physical distance of the fire hydrant 906 and/or the distance of the road sign 908 from the UE using these sensors. If there are inconsistencies in distances of the one or more objects/features derived from the vision-based or vision-aided positioning and from the other sensor(s), it may indicate that the images captured by the camera are likely virtual generated or inaccurate (e.g., as shown by FIG. 9B). The estimation of the first distance for at least one object in the set of images, the estimation of the second distance for the at least one object using a non-camera sensor, and/or the determination of the at least one spoofing feature is present may be performed by, e.g., the camera aided positioning component 198, the camera 1332, one or more sensor modules 1318, the application processor 1306, the cellular baseband processor 1324, and/or the transceiver(s) 1322 of the apparatus 1304 in FIG. 13.

In another example, the UE may verify, based on detecting that the at least one spoofing feature is present in the set of images, that the at least one spoofing feature is a valid spoofing feature. Then, to store or output the indication of the at least one spoofing feature, the UE may store or output the indication of the at least one spoofing feature based on verifying that the at least one spoofing feature is the valid spoofing feature.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), an ultra-wideband (UWB) module 1336, one or more sensor modules 1318 (e.g., barometric pressure sensor/altimeter; motion sensor such as inertial measurement unit (INU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, the UWB module 1336, and the SPS module 1316 may include an on-chip transceiver (TRX) (or in some cases, just a receiver (RX)). The Bluetooth module 1312, the WLAN module 1314, the UWB module 1336, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see UE 350 of FIG. 3) and include the additional modules of the apparatus 1304.

As discussed supra, the camera aided positioning component 198 may be configured to obtain a set of images associated with a camera-aided positioning session, where the set of images is captured using at least one first camera. The camera aided positioning component 198 may also be configured to detect that at least one spoofing feature is present in the set of images during the camera-aided positioning session. The camera aided positioning component 198 may also be configured to store or output an indication of the at least one spoofing feature based on the at least one spoofing feature being present in the set of images. The camera aided positioning component 198 may be within the cellular baseband processor 1324, the application processor 1306, or both the cellular baseband processor 1324 and the application processor 1306. The camera aided positioning component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, may include means for obtaining a set of images associated with a camera-aided positioning session, where the set of images is captured using at least one first camera. The apparatus 1304 may further include means for detecting that at least one spoofing feature is present in the set of images during the camera-aided positioning session. The apparatus 1304 may further include means for storing or means for outputting an indication of the at least one spoofing feature based on the at least one spoofing feature being present in the set of images.

In one configuration, the camera-aided positioning session may be associated with an absolute position of the UE, a relative position of the UE, an orientation of the UE, or a combination thereof.

In another configuration, the means for detecting that the at least one spoofing feature is present in the set of images include configuring the apparatus 1304 to estimate a first distance for at least one object in the set of images, adjust a focal length of the at least one first camera, capture a second set of images using the at least one first camera based on the adjusted focal length, estimate a second distance for the at least one object based on the second set of images, and determine the at least one spoofing feature is present if the first distance is different from the second distance by at least a distance threshold.

In another configuration, the means for detecting that the at least one spoofing feature is present in the set of images include configuring the apparatus 1304 to estimate a first velocity for at least one object in the set of images, estimate a second velocity for the at least one object using a non-camera sensor, and determine the at least one spoofing feature is present if the first velocity is different from the second velocity by at least a velocity threshold.

In another configuration, the means for detecting that the at least one spoofing feature is present in the set of images include configuring the apparatus 1304 to estimate a first shape for at least one object in the set of images, estimate a second shape for the at least one object using a non-camera sensor, and determine the at least one spoofing feature is present if the first shape is different from the second shape.

In another configuration, apparatus 1304 may further include means for performing the camera-aided positioning session based on at least one non-spoofing feature, where the at least one non-spoofing feature is different from the at least one spoofing feature.

In one configuration, the apparatus 1304 may further include means for receiving a map for a current location of the UE, and means for determining the at least one spoofing feature is present if one or more objects in the set of images does not match the map. In one implementation, the apparatus 1304 may further include means for determining an uncertainty associated with a position or a pose of the UE is below a threshold, where the map is received in response to the uncertainty being below the threshold. In another implementation, the means for determining the at least one spoofing feature is present if the one or more objects in the set of images does not match the map may include configuring the apparatus 1304 to extract a set of invariant features from the set of images, and determine the at least one spoofing feature is present if one or more invariant features in the set of invariant features do not exist in the map. In another implementation, the means for determining the at least one spoofing feature is present if the one or more objects in the set of images does not match the map may include configuring the apparatus 1304 to extract a set of features from the set of images, and determine the at least one spoofing feature is present if one or more features in the set of features are not located at corresponding locations that are within a location error threshold. In another implementation, the means for determining the at least one spoofing feature is present if the one or more objects in the set of images does not match the map may include configuring the apparatus 1304 to extract a set of properties for the one or more objects from the set of images, and determine the at least one spoofing feature is present if the set of properties do not exist in the map. In some implementations, the set of properties may correspond to at least one of: a shape of the one or more objects, a size of the one or more objects, or a color of the one or more objects.

In another configuration, the UE may increase a sampling rate of the at least one first camera, and determine the at least one spoofing feature is present if the set of images captured by the at least one first camera using the increased sampling rate including one or more patterns or observations associated with a lower display refresh rate, such as described in connection with FIGS. 9A and 9B. For configuration, as described in connection with FIGS. 9A and 9B, the UE may increase the sampling rate of its camera(s), and determine that its captured images are spoofed or include virtual object(s) if the captured images show blank gaps 1006. The increasing of the sampling rate and/or the determination of the at least one spoofing feature is present may be performed by, e.g., the camera aided positioning component 198, the camera 1332, the application processor 1306, the cellular baseband processor 1324, and/or the transceiver(s) 1322 of the apparatus 1304 in FIG. 13.

In another configuration, the apparatus 1304 may further include means for capturing a second set of images using at least one second camera, means for crosschecking for one or more objects between the set of images with the second set of images, and means for determining the at least one spoofing feature is present if there is an inconsistency for the one or more objects.

In another configuration, the apparatus 1304 may further include means for deriving a first IMU pose of the UE based on the set of images, means for deriving a second IMU pose of the UE based on a second set of images captured by at least a one second camera of the UE, and means for determining the at least one spoofing feature is present if the first IU pose is different from the second IU pose by at least a pose threshold.

In another configuration, the apparatus 1304 may further include means for estimating a first distance for at least one object in the set of images, means for estimating a second distance for the at least one object using a non-camera sensor, and means for determining the at least one spoofing feature is present if the first distance is different from the second distance by at least a distance threshold.

In another configuration, the apparatus 1304 may further include means for verifying, based on detecting that the at least one spoofing feature is present in the set of images, that the at least one spoofing feature is a valid spoofing feature. The means for storing or the means for outputting the indication of the at least one spoofing feature may include configuring the apparatus 1304 to store or output the indication of the at least one spoofing feature based on verifying that the at least one spoofing feature is the valid spoofing feature.

The means may be the camera aided positioning component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: obtaining a set of images associated with a camera-aided positioning session, where the set of images is captured using at least one first camera; detecting that at least one spoofing feature is present in the set of images during the camera-aided positioning session; and storing or outputting an indication of the at least one spoofing feature based on the at least one spoofing feature being present in the set of images.

Aspect 2 is the method of aspect 1, further including: performing the camera-aided positioning session based on at least one non-spoofing feature, where the at least one non-spoofing feature is different from the at least one spoofing feature.

Aspect 3 is the method of aspect 1 or 2, where detecting that the at least one spoofing feature is present in the set of images includes: receiving a map for a current location of the UE; and determining the at least one spoofing feature is present if one or more objects in the set of images does not match the map.

Aspect 4 is the method of aspect 3, further including: determining an uncertainty associated with a position or a pose of the UE is below a threshold, where the map is received in response to the uncertainty being below the threshold.

Aspect 5 is the method of aspect 3, where determining the at least one spoofing feature is present if the one or more objects in the set of images does not match the map includes: extracting a set of invariant features from the set of images; and determining the at least one spoofing feature is present if one or more invariant features in the set of invariant features do not exist in the map.

Aspect 6 is the method of aspect 3, where determining the at least one spoofing feature is present if the one or more objects in the set of images does not match the map includes: extracting a set of features from the set of images; and determining the at least one spoofing feature is present if one or more features in the set of features are not located at corresponding locations that are within a location error threshold.

Aspect 7 is the method of aspect 3, where determining the at least one spoofing feature is present if the one or more objects in the set of images does not match the map includes: extracting a set of properties for the one or more objects from the set of images; and determining the at least one spoofing feature is present if the set of properties do not exist in the map.

Aspect 8 is the method of aspect 7, where the set of properties corresponds to at least one of: a shape of the one or more objects, a size of the one or more objects, or a color of the one or more objects.

Aspect 9 is the method of any of aspects 1 to 8, where detecting that the at least one spoofing feature is present in the set of images includes: increasing a sampling rate of the at least one first camera; and determining the at least one spoofing feature is present if the set of images captured by the at least one first camera using the increased sampling rate including one or more patterns or observations associated with a lower display refresh rate.

Aspect 10 is the method of any of aspects 1 to 9, where detecting that the at least one spoofing feature is present in the set of images includes: capturing a second set of images using at least one second camera; crosschecking for one or more objects between the set of images with the second set of images; and determining the at least one spoofing feature is present if there is an inconsistency for the one or more objects.

Aspect 11 is the method of any of aspects 1 to 10, where detecting that the at least one spoofing feature is present in the set of images includes: deriving a first IMU pose of the UE based on the set of images; deriving a second IU pose of the UE based on a second set of images captured by at least a one second camera of the UE; and determining the at least one spoofing feature is present if the first IU pose is different from the second IMU pose by at least a pose threshold.

Aspect 12 is the method of any of aspects 1 to 11, where detecting that the at least one spoofing feature is present in the set of images includes: estimating a first distance for at least one object in the set of images; adjusting a focal length of the at least one first camera; capturing a second set of images using the at least one first camera based on the adjusted focal length; estimating a second distance for the at least one object based on the second set of images; and determining the at least one spoofing feature is present if the first distance is different from the second distance by at least a distance threshold.

Aspect 13 is the method of any of aspects 1 to 12, where detecting that the at least one spoofing feature is present in the set of images includes: estimating a first distance for at least one object in the set of images; estimating a second distance for the at least one object using a non-camera sensor; and determining the at least one spoofing feature is present if the first distance is different from the second distance by at least a distance threshold.

Aspect 14 is the method of any of aspects 1 to 13, where detecting that the at least one spoofing feature is present in the set of images includes: estimating a first velocity for at least one object in the set of images; estimating a second velocity for the at least one object using a non-camera sensor; and determining the at least one spoofing feature is present if the first velocity is different from the second velocity by at least a velocity threshold.

Aspect 15 is the method of any of aspects 1 to 14, where detecting that the at least one spoofing feature is present in the set of images includes: estimating a first shape for at least one object in the set of images; estimating a second shape for the at least one object using a non-camera sensor; and determining the at least one spoofing feature is present if the first shape is different from the second shape.

Aspect 16 is the method of any of aspects 1 to 15, where the camera-aided positioning session is associated with an absolute position of the UE, a relative position of the UE, an orientation of the UE, or a combination thereof.

Aspect 17 is the method of any of aspects 1 to 16, further including: verifying, based on detecting that the at least one spoofing feature is present in the set of images, that the at least one spoofing feature is a valid spoofing feature; where storing or outputting the indication of the at least one spoofing feature includes: storing or outputting the indication of the at least one spoofing feature based on verifying that the at least one spoofing feature is the valid spoofing feature.

Aspect 18 is an apparatus for wireless communication at a UE, including: a memory; and at least one processor coupled to the memory and, based at least in part on information stored in the memory, the at least one processor is configured to implement any of aspects 1 to 17.

Aspect 19 is the apparatus of aspect 18, further including at least one of a transceiver or an antenna coupled to the at least one processor.

Aspect 20 is an apparatus for wireless communication including means for implementing any of aspects 1 to 17.

Aspect 21 is a computer-readable medium (e.g., a non-transitory computer-readable medium) storing computer executable code, where the code when executed by a processor causes the processor to implement any of aspects 1 to 17.

What is claimed is:
1. An apparatus for wireless communication at a user equipment (UE), comprising:
   a memory; and
   at least one processor coupled to the memory, and the at least one processor is configured to:
      obtain a set of images associated with a camera-aided positioning session, wherein the set of images is captured using at least one first camera;
      detect that at least one spoofing feature is present in the set of images during the camera-aided positioning session by receiving a map for a current location of the UE and determining the at least one spoofing feature is present if one or more objects in the set of images does not match the map, wherein determining the at least one spoofing feature is present comprises extracting a set of invariant features from the set of images and determining the at least one spoofing feature is present if one or more invariant features in the set of invariant features do not exist in the map, wherein the invariant features comprise features that remain unchanged under different viewing conditions;

verify, based on the detection that the at least one spoofing feature is present in the set of images, that the at least one spoofing feature is a valid spoofing feature by comparing the at least one spoofing feature with historical spoofing patterns stored in a database; and store or output an indication of the at least one spoofing feature based on the verification that the at least one spoofing feature being present in the set of images is the valid spoofing feature.

2. The apparatus of claim 1, wherein the at least one processor is further configured to:

perform the camera-aided positioning session based on at least one non-spoofing feature, wherein the at least one non-spoofing feature is different from the at least one spoofing feature.

3. The apparatus of claim 1, wherein the at least one processor is further configured to:

determine an uncertainty associated with a position or a pose of the UE is below a threshold, wherein the at least one processor is configured to receive the map in response to the uncertainty being below the threshold.

4. The apparatus of claim 1, wherein to determine the at least one spoofing feature is present if the one or more objects in the set of images does not match the map, the at least one processor is configured to:

extract a set of features from the set of images; and determine the at least one spoofing feature is present if one or more features in the set of features are not located at corresponding locations that are within a location error threshold.

5. The apparatus of claim 1, wherein to determine the at least one spoofing feature is present if the one or more objects in the set of images does not match the map, the at least one processor is configured to:

extract a set of properties for the one or more objects from the set of images; and determine the at least one spoofing feature is present if the set of properties do not exist in the map.

6. The apparatus of claim 5, wherein the set of properties corresponds to at least one of:

a shape of the one or more objects, a size of the one or more objects, or a color of the one or more objects.

7. The apparatus of claim 1, wherein to detect that the at least one spoofing feature is present in the set of images, the at least one processor is configured to:

increase a sampling rate of the at least one first camera; and determine the at least one spoofing feature is present if the set of images captured by the at least one first camera using the increased sampling rate including one or more patterns or observations associated with a lower display refresh rate.

8. The apparatus of claim 1, wherein to detect that the at least one spoofing feature is present in the set of images, the at least one processor is configured to:

capture a second set of images using at least one second camera;

crosscheck for one or more objects between the set of images with the second set of images; and determine the at least one spoofing feature is present if there is an inconsistency for the one or more objects.

9. The apparatus of claim 1, wherein to detect that the at least one spoofing feature is present in the set of images, the at least one processor is configured to:

derive a first inertial measurement unit (IMU) pose of the UE based on the set of images;

derive a second IMU pose of the UE based on a second set of images captured by at least a one second camera of the UE; and determine the at least one spoofing feature is present if the first IMU pose is different from the second IMU pose by at least a pose threshold.

10. The apparatus of claim 1, wherein to detect that the at least one spoofing feature is present in the set of images, the at least one processor is configured to:

estimate a first distance for at least one object in the set of images;

adjust a focal length of the at least one first camera;

capture a second set of images using the at least one first camera based on the adjusted focal length;

estimate a second distance for the at least one object based on the second set of images; and determine the at least one spoofing feature is present if the first distance is different from the second distance by at least a distance threshold.

11. The apparatus of claim 1, wherein to detect that the at least one spoofing feature is present in the set of images, the at least one processor is configured to:

estimate a first distance for at least one object in the set of images;

estimate a second distance for the at least one object using a non-camera sensor; and determine the at least one spoofing feature is present if the first distance is different from the second distance by at least a distance threshold.

12. The apparatus of claim 1, wherein to detecting that the at least one spoofing feature is present in the set of images, the at least one processor is configured to:

estimate a first velocity for at least one object in the set of images;

estimate a second velocity for the at least one object using a non-camera sensor; and determine the at least one spoofing feature is present if the first velocity is different from the second velocity by at least a velocity threshold.

13. The apparatus of claim 1, wherein to detect that the at least one spoofing feature is present in the set of images, the at least one processor is configured to:

estimate a first shape for at least one object in the set of images;

estimate a second shape for the at least one object using a non-camera sensor; and determine the at least one spoofing feature is present if the first shape is different from the second shape.

14. The apparatus of claim 1, wherein the camera-aided positioning session is associated with an absolute position of the UE, a relative position of the UE, an orientation of the UE, or a combination thereof.

15. The apparatus of claim 1, wherein the at least one processor is further configured to:

verify, based on the detection that the at least one spoofing feature is present in the set of images, that the at least one spoofing feature is a valid spoofing feature;

wherein to store or output the indication of the at least one spoofing feature, the at least one processor is configured to: store or output the indication of the at least one spoofing feature based on the verification that the at least one spoofing feature is the valid spoofing feature.

16. A method of wireless communication at a user equipment (UE), comprising:
- obtaining a set of images associated with a camera-aided positioning session, wherein the set of images is captured using at least one first camera;
- detecting that at least one spoofing feature is present in the set of images during the camera-aided positioning session by receiving a map for a current location of the UE and determining the at least one spoofing feature is present if one or more objects in the set of images does not match the map, wherein determining the at least one spoofing feature is present comprises extracting a set of invariant features from the set of images and determining the at least one spoofing feature is present if one or more invariant features in the set of invariant features do not exist in the map, wherein the invariant features comprise features that remain unchanged under different viewing conditions;
- verifying, based on the detection that the at least one spoofing feature is present in the set of images, that the at least one spoofing feature is a valid spoofing feature by comparing the at least one spoofing feature with historical spoofing patterns stored in a database; and
- storing or outputting an indication of the at least one spoofing feature based on the verification that the at least one spoofing feature being present in the set of images is the valid spoofing feature.

17. The method of claim 16, further comprising:
- performing the camera-aided positioning session based on at least one non-spoofing feature, wherein the at least one non-spoofing feature is different from the at least one spoofing feature.

18. The method of claim 16, wherein detecting that the at least one spoofing feature is present in the set of images comprises:
- increasing a sampling rate of the at least one first camera; and
- determining the at least one spoofing feature is present if the set of images captured by the at least one first camera using the increased sampling rate including one or more patterns or observations associated with a lower display refresh rate.

19. The method of claim 16, wherein detecting that the at least one spoofing feature is present in the set of images comprises:
- capturing a second set of images using at least one second camera;
- crosschecking for one or more objects between the set of images with the second set of images; and
- determining the at least one spoofing feature is present if there is an inconsistency for the one or more objects.

20. The method of claim 16, wherein detecting that the at least one spoofing feature is present in the set of images comprises:
- deriving a first inertial measurement unit (IMU) pose of the UE based on the set of images;
- deriving a second IMU pose of the UE based on a second set of images captured by at least a one second camera of the UE; and
- determining the at least one spoofing feature is present if the first IMU pose is different from the second IMU pose by at least a pose threshold.

21. The method of claim 16, wherein detecting that the at least one spoofing feature is present in the set of images comprises:
- estimating a first distance for at least one object in the set of images;
- adjusting a focal length of the at least one first camera;
- capturing a second set of images using the at least one first camera based on the adjusted focal length;
- estimating a second distance for the at least one object based on the second set of images; and
- determining the at least one spoofing feature is present if the first distance is different from the second distance by at least a distance threshold.

22. The method of claim 16, wherein detecting that the at least one spoofing feature is present in the set of images comprises:
- estimating a first distance for at least one object in the set of images;
- estimating a second distance for the at least one object using a non-camera sensor; and
- determining the at least one spoofing feature is present if the first distance is different from the second distance by at least a distance threshold.

23. The method of claim 16, wherein detecting that the at least one spoofing feature is present in the set of images comprises:
- estimating a first velocity for at least one object in the set of images;
- estimating a second velocity for the at least one object using a non-camera sensor; and
- determining the at least one spoofing feature is present if the first velocity is different from the second velocity by at least a velocity threshold.

24. The method of claim 16, wherein detecting that the at least one spoofing feature is present in the set of images comprises:
- estimating a first shape for at least one object in the set of images;
- estimating a second shape for the at least one object using a non-camera sensor; and
- determining the at least one spoofing feature is present if the first shape is different from the second shape.

25. The method of claim 16, further comprising:
- verifying, based on detecting that the at least one spoofing feature is present in the set of images, that the at least one spoofing feature is a valid spoofing feature;
- wherein storing or outputting the indication of the at least one spoofing feature comprises:
storing or outputting the indication of the at least one spoofing feature based on verifying that the at least one spoofing feature is the valid spoofing feature.

26. An apparatus for wireless communication at a user equipment (UE), comprising:
- means for obtaining a set of images associated with a camera-aided positioning session, wherein the set of images is captured using at least one first camera;
- means for detecting that at least one spoofing feature is present in the set of images during the camera-aided positioning session by receiving a map for a current location of the UE and determining the at least one spoofing feature is present if one or more objects in the set of images does not match the map, wherein determining the at least one spoofing feature is present comprises extracting a set of invariant features from the set of images and determining the at least one spoofing feature is present if one or more invariant features in the set of invariant features do not exist in the map, wherein the invariant features comprise features that remain unchanged under different viewing conditions;
- means for verifying, based on the detection that the at least one spoofing feature is present in the set of images, that the at least one spoofing feature is a valid spoofing feature by comparing the at least one spoofing feature with historical spoofing patterns stored in a database; and means for storing or outputting an indication of the at least one spoofing feature based on the verification that the at least one spoofing feature being present in the set of images is the valid spoofing feature.

\* \* \* \* \*